United States Patent
Kumar et al.

(10) Patent No.: US 12,302,183 B2
(45) Date of Patent: May 13, 2025

(54) KEY PERFORMANCE INDICATOR IMPROVEMENTS IN WIRELESS COMMUNICATION

(71) Applicant: QUALCOMM Incorporated, San Diego, CA (US)

(72) Inventors: Akash Kumar, Hyderabad (IN); Hargovind Prasad Bansal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/475,021

(22) Filed: Sep. 26, 2023

(65) Prior Publication Data
US 2024/0015622 A1 Jan. 11, 2024

Related U.S. Application Data

(62) Division of application No. 16/917,556, filed on Jun. 30, 2020, now Pat. No. 11,785,514.
(Continued)

(51) Int. Cl.
*H04W 8/24* (2009.01)
*H04W 36/00* (2009.01)
(Continued)

(52) U.S. Cl.
CPC ........... *H04W 36/08* (2013.01); *H04W 8/245* (2013.01); *H04W 36/0058* (2018.08);
(Continued)

(58) Field of Classification Search
CPC ... H04W 8/24; H04W 8/245; H04W 36/0058; H04W 36/008357; H04W 36/837;
(Continued)

(56) References Cited

U.S. PATENT DOCUMENTS

| 11,224,010 B2 | 1/2022 | Reial et al. |
| 2010/0029274 A1 | 2/2010 | Deshpande et al. |

(Continued)

OTHER PUBLICATIONS

International Preliminary Report on Patentability—PCT/US2020/040556—The International Bureau of WIPO—Geneva, Switzerland—Jan. 13, 2022.
(Continued)

*Primary Examiner* — Matthew W Genack
(74) *Attorney, Agent, or Firm* — Muncy, Geissler, Olds & Lowe, P.C./Qualcomm Incorporated

(57) ABSTRACT

Techniques to maximize connectivity to a preferred radio access technology (RAT) (e.g., 5G NR) over a less preferred RAT (e.g., 4G LTE) are disclosed. When a user equipment (UE) is camped on a preferred RAT connectivity capable cell (e.g., NR cell, EUTRA dual-connectivity (ENDC) cell), offsets or biases may be applied to delay triggering of a cell reselection. When UE is camped on a non-preferred RAT connectivity capable cell, offset(s) may be applied to accelerate triggering of the cell reselection. When cell reselection
(Continued)

is triggered, offsets or biases may be applied to favor reselection to preferred RAT connectivity capable cell over a non-preferred RAT connectivity capable cell.

22 Claims, 10 Drawing Sheets

Related U.S. Application Data

(60) Provisional application No. 62/869,935, filed on Jul. 2, 2019.

(51) Int. Cl.
*H04W 36/08* (2009.01)
*H04W 36/14* (2009.01)
*H04W 36/30* (2009.01)

(52) U.S. Cl.
CPC .............. *H04W 36/008357* (2023.05); *H04W 36/00837* (2018.08); *H04W 36/0094* (2013.01); *H04W 36/1443* (2023.05); *H04W 36/30* (2013.01)

(58) Field of Classification Search
CPC . H04W 36/0094; H04W 36/08; H04W 36/14; H04W 36/142; H04W 36/144; H04W 36/1443; H04W 36/1446; H04W 36/18
See application file for complete search history.

(56) References Cited

U.S. PATENT DOCUMENTS

| | | |
|---|---|---|
| 2013/0189996 A1* | 7/2013 | Sridhar ........... H04W 36/00837 455/444 |
| 2015/0036663 A1 | 2/2015 | Kilpatrick, II et al. |
| 2017/0064593 A1 | 3/2017 | Khay-Ibbat et al. |
| 2018/0279216 A1 | 9/2018 | Reial et al. |
| 2018/0343593 A1 | 11/2018 | Singh et al. |
| 2019/0150042 A1 | 5/2019 | Srivastava et al. |
| 2021/0007025 A1 | 1/2021 | Kumar et al. |

OTHER PUBLICATIONS

International Search Report and Written Opinion—PCT/US2020/040556—ISA/EPO—Oct. 8, 2020.

* cited by examiner

```
DL-DCCH-Message ::= {
  message: c1: rrcConnectionReconfiguration: RRCConnectionReconfiguration ::= {
    rrc-TransactionIdentifier: 0
    criticalExtensions: c1: rrcConnectionReconfiguration-r15:
      RRCConnectionReconfiguration-r15-Ies ::= {
        <>
      }
    }
  }
  reportConfigToAddModList: ReportConfigToAddModList ::= {
    ReportConToAddMod ::= {
      reportConfigID: 7
      reportConfig: reportConfigEUTRA: ReportConfigEUTRA ::= {
        triggerType: event: event ::= {
          eventID: eventR5: eventR5 ::= {
            a5-Threshold1: threashold-RSRP: 31
            a5-Threshold2: threashold-RSRP: 37
          }
          hysterisis: 2
          timeToTrigger: 11 (ms640)
        }
        ┌─────────────────────────┐
        │ EN-DC support: YES/NO   │
        │ EN-DC offset: 4         │
        └─────────────────────────┘
        triggerQuantity: 0 (rsrp)
        reportQuantity: 0 (sameAsTriggerQuantity)
        maxReportCells: 4
        reportInterval: 1 (ms240)
        reportAmount: 7 (infinity)
        reportConfigEUTRA-ext1: ReportConfigEUTRA-ext1 ::= {
          reportAddNeighMeas-r10: 0 (setup)
        }
      }
    }
  }
}
```

FIG. 8

KEY PERFORMANCE INDICATOR IMPROVEMENTS IN WIRELESS COMMUNICATION

CROSS-REFERENCE TO RELATED APPLICATION

The present application for patent is a divisional of U.S. patent application Ser. No. 16/917,556, entitled "KEY PERFORMANCE INDICATOR IMPROVEMENTS IN WIRELESS COMMUNICATION," filed Jun. 30, 2020, assigned to the assignee hereof, and expressly incorporated herein by reference in its entirety, which claims the benefit of U.S. Provisional Patent Application No. 62/869,935 entitled "KEY PERFORMANCE INDICATOR IMPROVEMENTS IN WIRELESS COMMUNICATION," filed Jul. 2, 2019, assigned to the assignee hereof, and expressly incorporated herein by reference in its entirety.

TECHNICAL FIELD

Various aspects described herein generally relate to wireless communication systems, and more particularly, improving key performance indicators (KPI) in wireless communications, e.g., to maximize connectivity to a cell of a preferred radio access technology (RAT).

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G New Radio (NR) connectivity, or simply NR connectivity, has gained significant commercial traction in recent time. Thus, to attract more users to their network, network operators would like to show NR connectivity to users most of the time on the user interface (UI) of the mobile device such as the user equipment (UE).

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary method performed by a user equipment (UE) is disclosed. The method comprises obtaining one or more reselection parameters defining biases to favor connectivity of the UE to a preferred RAT connectivity capable cell over a non-preferred RAT connectivity capable cell. The one or more reselection parameters include one or more current serving cell reselection offsets and one or more new serving cell selection offsets. A preferred RAT connectivity capable cell refers to a preferred RAT capable cell or to a cell capable of providing connectivity to a preferred RAT capable cell. The method also comprises determining, when the UE is in an idle mode and is camped on a current serving cell, whether or not to trigger cell reselection based on one or more signals measured from the current serving cell and based on the one or more current serving cell reselection offsets. The method further comprises determining whether or not a new serving cell is found based on one or more signals measured from one or more neighbor cells and based on the one or more new serving cell selection offsets. The method yet further comprises camping on the new serving cell when the new serving cell is found.

An exemplary user equipment (UE) is disclosed. The UE comprises a transceiver circuitry, a memory circuitry, and a processor circuitry. The transceiver, memory circuitry and processor circuitries are configured to obtain one or more reselection parameters defining biases to favor connectivity of the UE to a preferred RAT connectivity capable cell over a non-preferred RAT connectivity capable cell. The one or more reselection parameters include one or more current serving cell reselection offsets and one or more new serving cell selection offsets. A preferred RAT connectivity capable cell refers to a preferred RAT capable cell or to a cell capable of providing connectivity to a preferred RAT capable cell. The transceiver, memory circuitry and processor circuitries are also configured to determine, when the UE is in an idle mode and is camped on a current serving cell, whether or not to trigger cell reselection based on one or more signals measured from the current serving cell and based on the one or more current serving cell reselection offsets. The transceiver, memory circuitry and processor circuitries are further configured to determine whether or not a new serving cell is found based on one or more signals measured from one or more neighbor cells and based on the one or more new serving cell selection offsets. The transceiver, memory circuitry and processor circuitries are yet further configured to camp on the new serving cell when the new serving cell is found.

Another exemplary user equipment (UE) is disclosed. The UE comprises means for obtaining one or more reselection parameters defining biases to favor connectivity of the UE to a preferred RAT connectivity capable cell over a non-preferred RAT connectivity capable cell. The one or more reselection parameters include one or more current serving cell reselection offsets and one or more new serving cell selection offsets. A preferred RAT connectivity capable cell refers to a preferred RAT capable cell or to a cell capable of providing connectivity to a preferred RAT capable cell. The UE also comprises means for determining, when the UE is in an idle mode and is camped on a current serving cell, whether or not to trigger cell reselection based on one or more signals measured from the current serving cell and based on the one or more current serving cell reselection offsets. The UE further comprises means for determining whether or not a new serving cell is found based on one or more signals measured from one or more neighbor cells and based on the one or more new serving cell selection offsets. The UE yet further comprises means for camping on the new serving cell when the new serving cell is found.

A non-transitory computer-readable medium storing computer-executable instructions for a user equipment (UE) is disclosed. The executable instructions comprise one or more instructions causing the UE to obtain one or more reselection parameters defining biases to favor connectivity of the UE to a preferred RAT connectivity capable cell over a non-preferred RAT connectivity capable cell. The one or more reselection parameters include one or more current serving cell reselection offsets and one or more new serving cell selection offsets. A preferred RAT connectivity capable cell refers to a preferred RAT capable cell or to a cell capable of providing connectivity to a preferred RAT capable cell. The executable instructions also comprise one or more instructions causing the UE to determine, when the UE is in an idle mode and is camped on a current serving cell, whether or not to trigger cell reselection based on one or more signals measured from the current serving cell and based on the one or more current serving cell reselection offsets. The executable instructions further comprise one or more instructions causing the UE to determine whether or not a new serving cell is found based on one or more signals measured from one or more neighbor cells and based on the one or more new serving cell selection offsets. The executable instructions yet further comprise one or more instructions causing the UE to camp on the new serving cell when the new serving cell is found.

An exemplary method performed by a network node of a network serving a user equipment (UE) is disclosed. The method comprises determining one or more reselection parameters defining biases to favor connectivity of the UE to a preferred RAT connectivity capable cell over a non-preferred RAT connectivity capable cell when the UE performs a cell reselection from a current serving cell to a new serving cell. The one or more reselection parameters include one or more current serving cell reselection offsets and one or more new serving cell selection offsets. A preferred RAT connectivity capable cell refers to a preferred RAT capable cell or to a cell capable of providing connectivity to a preferred RAT capable cell. The method also comprises sending to the UE the one or more reselection parameters. The one or more reselection parameters are determined offline and/or are determined based on minimization of drive test (MTD) reports.

An exemplary network node of a network serving a user equipment (UE) is disclosed. The current serving cell comprises a transceiver circuitry, a memory circuitry, and a processor circuitry. The transceiver, memory circuitry and processor circuitries are configured to determine one or more reselection parameters defining biases to favor connectivity of the UE to a preferred RAT connectivity capable cell over a non-preferred RAT connectivity capable cell when the UE performs a cell reselection from a current serving cell to a new serving cell. The one or more reselection parameters include one or more current serving cell reselection offsets and one or more new serving cell selection offsets. A preferred RAT connectivity capable cell refers to a preferred RAT capable cell or to a cell capable of providing connectivity to a preferred RAT capable cell. The transceiver, memory circuitry and processor circuitries are also configured to send to the UE the one or more reselection parameters. The one or more reselection parameters are determined offline and/or are determined based on minimization of drive test (MTD) reports.

Another exemplary network node of a network serving a user equipment (UE) is disclosed. The network node comprises means for determining one or more reselection parameters defining biases to favor connectivity of the UE to a preferred RAT connectivity capable cell over a non-preferred RAT connectivity capable cell when the UE performs a cell reselection from a current serving cell to a new serving cell. The one or more reselection parameters include one or more current serving cell reselection offsets and one or more new serving cell selection offsets. A preferred RAT connectivity capable cell refers to a preferred RAT capable cell or to a cell capable of providing connectivity to a preferred RAT capable cell. The network node also comprises means for sending to the UE the one or more reselection parameters. The one or more reselection parameters are determined offline and/or are determined based on minimization of drive test (MTD) reports.

A non-transitory computer-readable medium storing computer-executable instructions for a network node of a network serving a user equipment (UE) is disclosed. The executable instructions comprise one or more instructions causing the network node to determine one or more reselection parameters defining biases to favor connectivity of the UE to a preferred RAT connectivity capable cell over a non-preferred RAT connectivity capable cell when the UE performs a cell reselection from a current serving cell to a new serving cell. The one or more reselection parameters include one or more current serving cell reselection offsets and one or more new serving cell selection offsets. A preferred RAT connectivity capable cell refers to a preferred RAT capable cell or to a cell capable of providing connectivity to a preferred RAT capable cell. The executable instructions also comprise one or more instructions causing the network node to send to the UE the one or more reselection parameters. The one or more reselection parameters are determined offline and/or are determined based on minimization of drive test (MTD) reports.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof:

FIG. 8 illustrates an example way a measurement object may be configured for handovers in accordance with one or more aspects of the disclosure.

DETAILED DESCRIPTION

Figure 1:
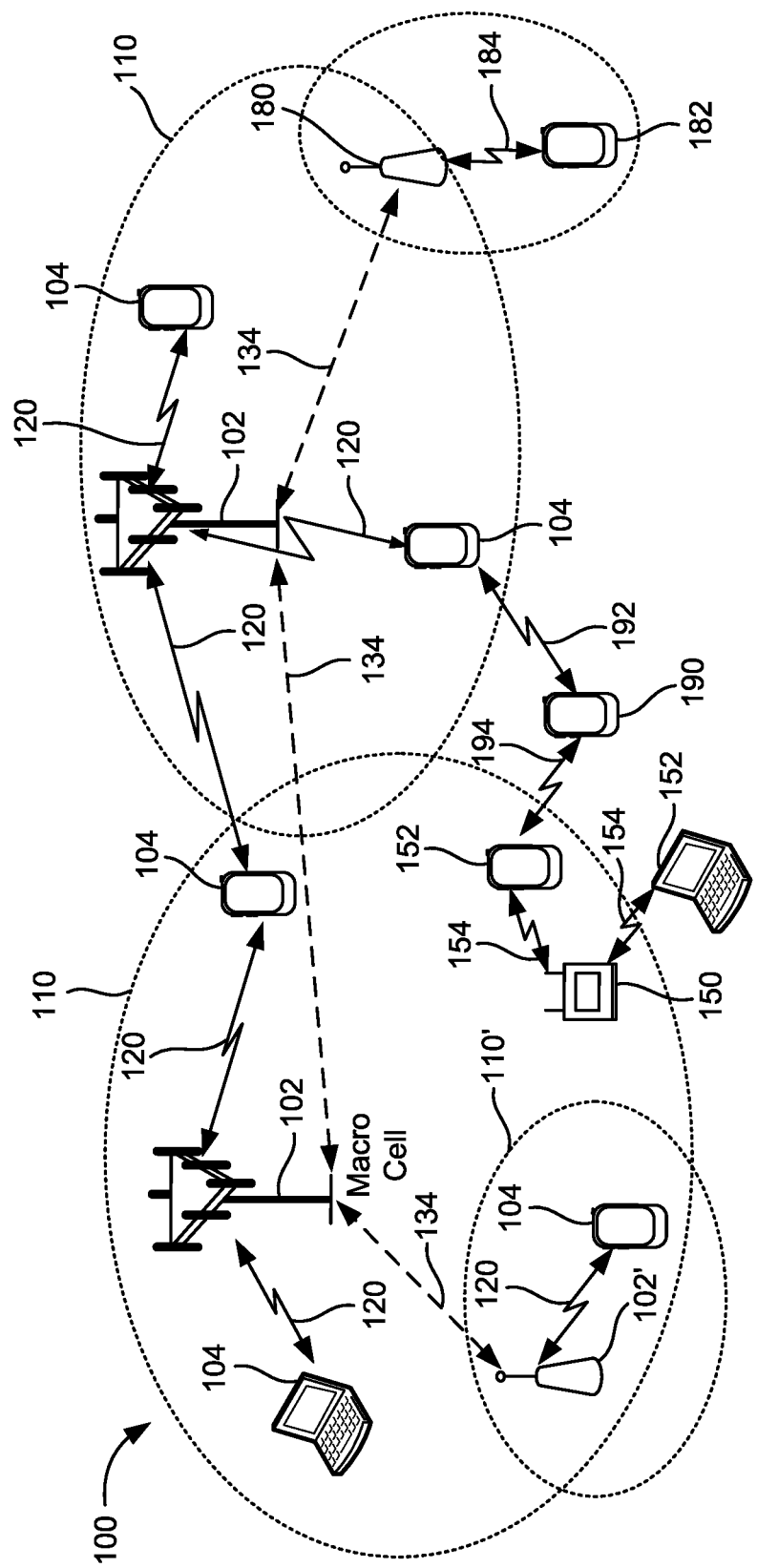
FIG. 1 illustrates an exemplary wireless communications system in accordance with one or more aspects of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates an exemplary wireless communications system 100 according to one or more aspects. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to an LTE network, gNodeBs (gNBs) where the wireless communications system 100 corresponds to a 5G network, and/or a combination thereof, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighbor macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs) and/or Home gNodeBs, which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple input multiple output (MIMO) antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the radio frequency (RF) range in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2:
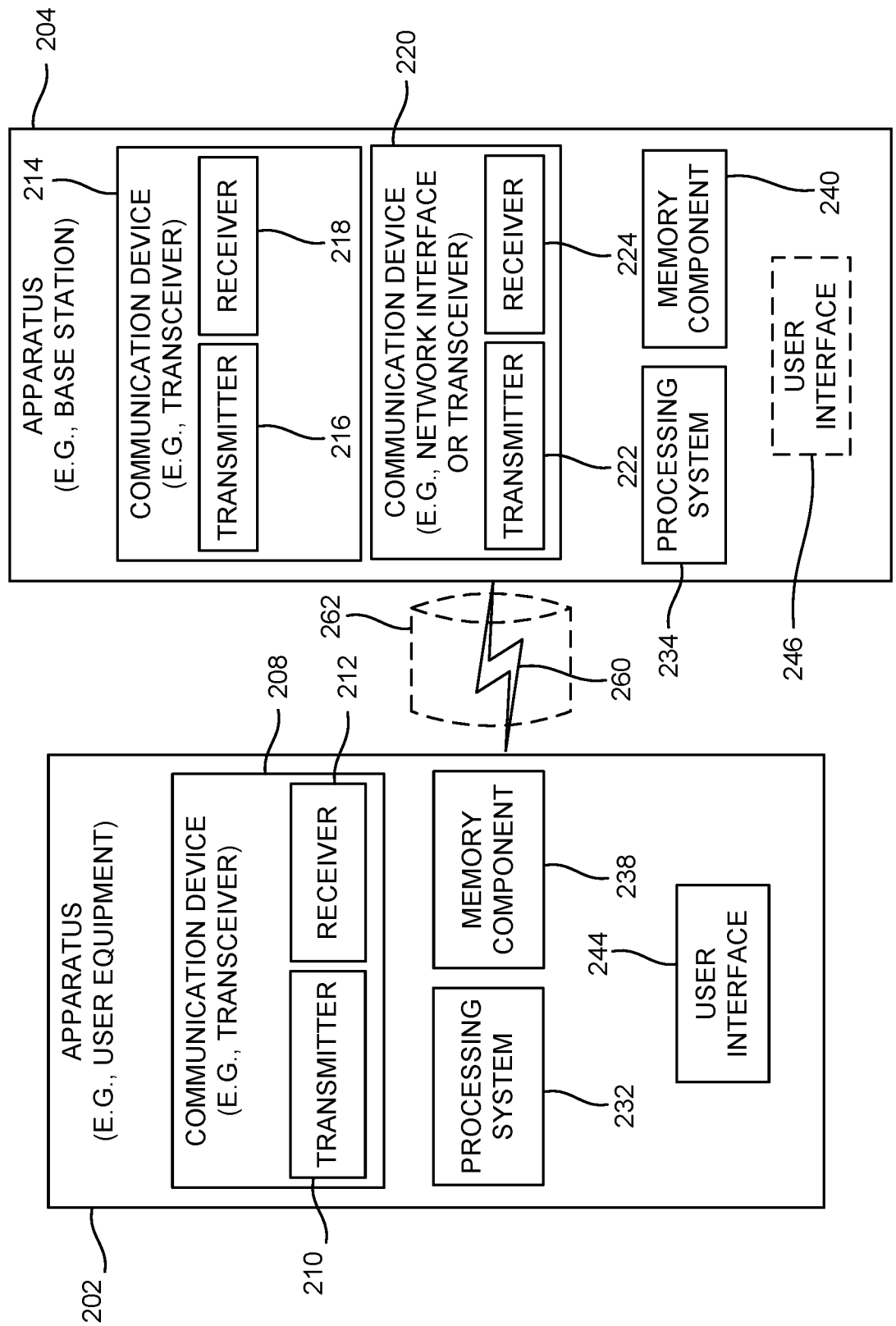
FIG. 2 is a simplified block diagram of several sample aspects of components that may be employed in wireless communication nodes and configured to support communication in accordance with one or more aspects of the disclosure.

FIG. 2 illustrates several sample components (represented by corresponding blocks) that may be incorporated into an apparatus 202 and an apparatus 204 (corresponding to, for example, a UE and a base station (e.g., eNB, gNB), respectively, to support the operations as disclosed herein. As an example, the apparatus 202 may correspond to a UE, and the apparatus 204 may correspond to a network node such as a gNB 222 and/or an eNB 224. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 202 and the apparatus 204 each may include at least one wireless communication device (represented by the communication devices 208 and 214) for communicating with other nodes via at least one designated RAT (e.g., LTE, NR). Each communication device 208 may include at least one transmitter (represented by the transmitter 210) for transmitting and encoding signals (e.g., messages, indications, information, and so on) and at least one receiver (represented by the receiver 212) for receiving and decoding signals (e.g., messages, indications, information, pilots, and so on). Each communication device 214 may include at least one transmitter (represented by the transmitter 216) for transmitting signals (e.g., messages, indications, information, pilots, and so on) and at least one receiver (represented by the receiver 218) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 204 may also comprise a Network Listen Module (NLM) or the like for performing various measurements.

The apparatus 204 may include at least one communication device (represented by the communication device 220) for communicating with other nodes. For example, the communication device 220 may comprise a network interface (e.g., one or more network access ports) configured to communicate with one or more network entities via a wire-based or wireless backhaul connection. In some aspects, the communication device 220 may be implemented as a transceiver configured to support wire-based or wireless signal communication. This communication may involve, for example, sending and receiving messages, parameters, or other types of information. Accordingly, in the example of FIG. 2, the communication device 220 is shown as comprising a transmitter 222 and a receiver 224 (e.g., network access ports for transmitting and receiving).

The apparatuses 202 and 204 may also include other components used in conjunction with the operations as disclosed herein. The apparatus 202 may include a processing system 232 for providing functionality relating to, for example, communication with the network. The apparatus 204 may include a processing system 234 for providing functionality relating to, for example, communication with the UEs. In an aspect, the processing systems 232 and 234 may include, for example, one or more general purpose processors, multi-core processors, ASICs, digital signal processors (DSPs), field programmable gate arrays (FPGA), or other programmable logic devices or processing circuitry.

The apparatuses 202 and 204 may include memory components 238 and 240 (e.g., each including a memory device), respectively, for maintaining information (e.g., information indicative of reserved resources, thresholds, parameters, and so on). In addition, the apparatuses 202 and 204 may include user interface devices 244 and 246, respectively, for providing indications (e.g., audible and/or visual indications) to a user and/or for receiving user input (e.g., upon user actuation of a sensing device such a keypad, a touch screen, a microphone, and so on).

For convenience, the apparatuses 202 and 204 are shown in FIG. 2 as including various components that may be configured according to the various examples described herein. It will be appreciated, however, that the illustrated blocks may have different functionality in different designs.

The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 208, 232, 238, and 244 may be implemented by processor and memory component(s) of the apparatus 202 (e.g., by execution of appropriate code and/or by appropriate configuration of processor components). Similarly, some or all of the functionality represented by blocks 214, 220, 234, 240, and 246 may be implemented by processor and memory component(s) of the apparatus 204 (e.g., by execution of appropriate code and/or by appropriate configuration of processor components).

In an aspect, the apparatus 204 may correspond to a "small cell" or a Home gNodeB. The apparatus 202 may transmit and receive messages via a wireless link 260 with the apparatus 204, the messages including information related to various types of communication (e.g., voice, data, multimedia services, associated control signaling, etc.). The wireless link 260 may operate over a communication medium of interest, shown by way of example in FIG. 2 as the medium 262, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 204 and the apparatus 202 for the medium 262.

In general, the apparatus 202 and the apparatus 204 may operate via the wireless link 260 according to one or more radio access types, such as LTE, LTE-U, or NR, depending on the network in which they are deployed. These networks may include, for example, different variants of CDMA networks (e.g., LTE networks, NR networks, etc.), TDMA networks, FDMA networks, Orthogonal FDMA (OFDMA) networks, Single-Carrier FDMA (SC-FDMA) networks, and so on.

A UE may be capable of operating in either 5G NR or in legacy 4G LTE. For performance and other reasons, 5G NR connection may be preferred over 4G LTE connection if and when both connections are available. More generically, when a UE is capable of operating in a first radio access technology (RAT) and a second RAT, a first RAT connectivity may be preferred over a second RAT connectivity.

For a UE that is capable of operating in both the first RAT (e.g., 5G NR) and the second RAT (4G LTE), it is proposed to maximize the UE's connectivity to the first RAT when both first and second RATs are available. In particular, some operators are defining a UE key performance indicator (KPI) which measures an amount of time the UE shows no 5G availability on its user interface (UI). One aim (of which there can be several) of the proposed techniques is to ensure that the UE has connectivity to the preferred RAT as much as possible, and to show such connectivity to the end user on the UI of the UE.

For discussions below, 5G NR—or simply "NR"—will be used as an example of the first RAT or the preferred RAT. Also, 4G LTE—or simply "LTE"—will be used as an example of the second RAT or the other RAT. However, this should not be viewed as a limitation. The first and second RATs may be any of the RATs currently known (e.g., WiMax, CDMA, WCDMA, UTRA, EUTRA, GSM, FDMA, GSM, TDMA, etc.). Indeed, some end users may prefer LTE over NR, for example, when LTE offers lower financial cost.

A base station (e.g., eNB, gNB, etc.) may be standalone (SA) or non-standalone (NSA). When a UE is connected to an SA cell, whether NR or LTE, informing the user is straight forward. That is, when the UE is connected to an NR SA cell, then the UE may display an NR icon on the UI. On the other hand, when the UE is connected to an LTE SA cell, then the UE may display an LTE icon on the UI.

A base station (e.g., eNB) may be an NSA base station. For example, a UE may be connected, e.g., in idle mode, to an LTE cell that is connected to an NR cell through a backhaul. If the UE goes into a connected mode and has a high data usage, it may be served by the LTE cell through a primary LTE carrier. Also, depending on the data usage and the availability of NR cells, the network may incorporate a secondary NR carrier for the UE. In this instance, if the UE is connected to the NSA LTE cell in idle mode, the UE still may display the NR icon since NR connectivity can be readily accessed when needed. An NSA LTE cell may also be referred to as EUTRA NR dual connectivity (ENDC) capable cell or as ENDC capable cell. Note that "ENDC LTE" and "ENDC capable" cells may be used interchangeably.

As indicated above, in one or more aspects, the proposed techniques maximize the NR availability to the end user. More broadly, the proposed techniques maximize the availability of the preferred RAT (e.g., first RAT over second RAT). This may be achieved through one or more UE-based solutions, with no changes to specifications of existing standards, no changes to signaling, and no changes to information elements (IEs).

In a UE-based solution, it is proposed to have one or more reselection parameters providing offsets/biases. For example, during cell reselection within LTE cells when the UE is in idle mode, the UE may determine whether or not LTE cells are ENDC capable, e.g., through examining the 'UpperLayerIndication' IE in SIBx. That is, the UE may determine whether or not the LTE cells are dual-connectivity (more generically, multi-connectivity) capable. The reselection parameters may be pre-configured into the UE. Alternatively or in addition thereto, the reselection parameters may be configurable by a network operator, e.g., through a reselection configuration message such as an embedded file system (EFS) message.

Based on the determinations, the UE may incorporate the configured reselection parameters while evaluating the S-criterion of the ENDC LTE cells so that ENDC LTE cells are prioritized over non-ENDC LTE cells, i.e., NSA LTE cells are prioritized over SA LTE cells. Also, NR cells (whether NSA or SA) are prioritized over SA LTE cells. In other words, the reselection parameters may be set to offset or bias the cell reselection to favor both NR and ENDC LTE cells over non-ENDC LTE cells.

Through the reselection parameters, the UE may stay connected to ENDC LTE and NR cells for a longer duration, and therefore, show NR availability on the UE's UI for that much longer. As a result, the KPI, which measures the percentage and/or amount of time the UE does not have NR coverage, may be improved (i.e., reduced amount of time without NR coverage).

In one or more aspects, the reselection parameters may be considered only for those NR and/or LTE cells that satisfy the S-criterion before the application of the reselection parameters. In this way, the reselection parameters may be applied only to cells whose signals are sufficiently strong and/or have sufficient quality as measured by the UE.

Alternatively or in addition to UE-based solutions, one or more network-assisted solutions may be proposed in which the network may include some or all of the reselection parameters in signaling messages that the network sends off to the UE. For example, a suitable IE may be added in the specification of the standard.

Figure 3:
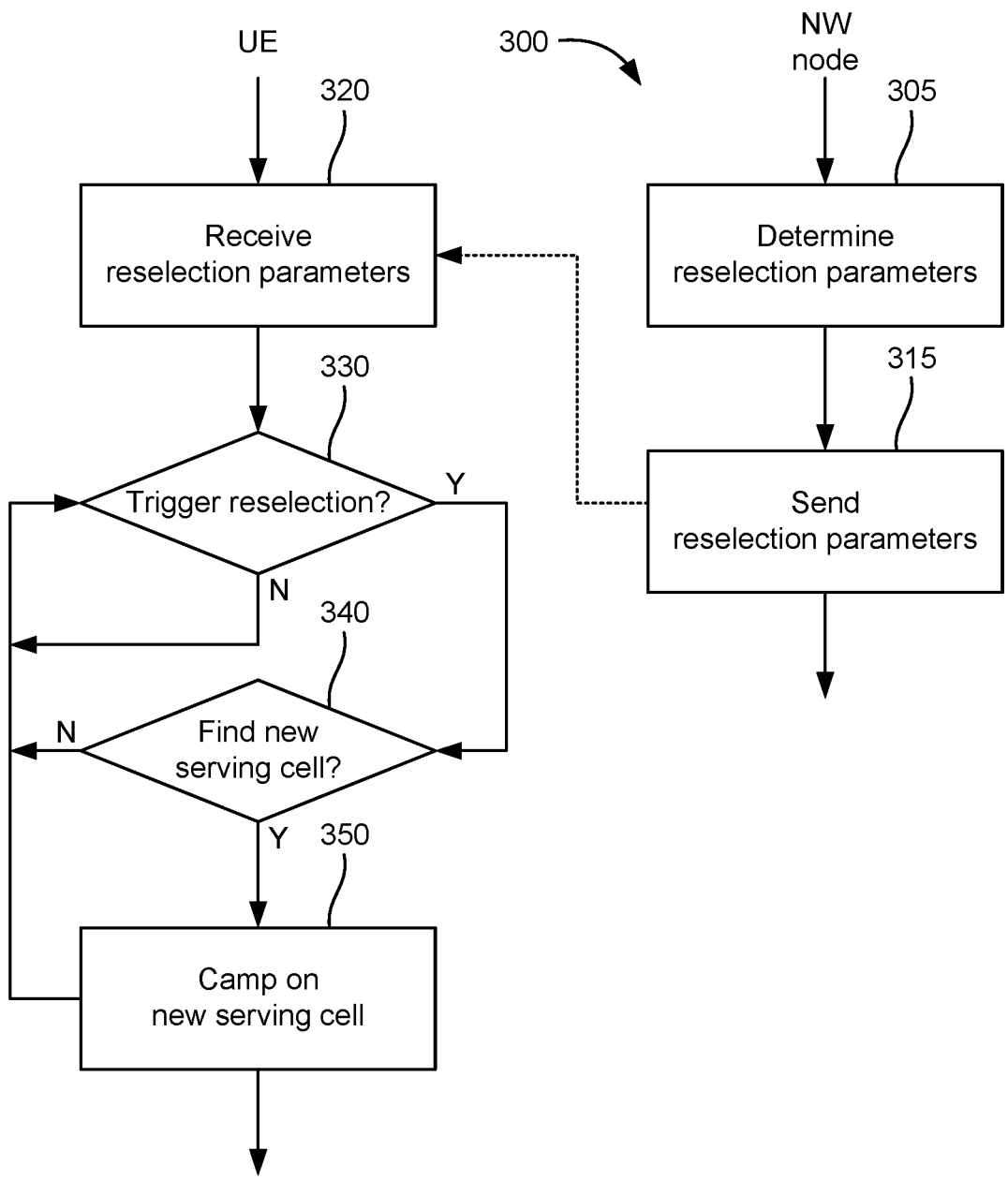
FIG. 3 illustrates a flow chart of an exemplary method performed by a UE and a network node of a network serving the UE to maximize the UE's connectivity to a preferred RAT in accordance with one or more aspects of the disclosure.

FIG. 3 illustrates a flow chart of an exemplary method 300 performed by a UE (e.g., any of the UEs of FIGS. 1 and 2) and a network node (e.g., any of the base stations of FIGS. 1 and 2) to maximize the UE's connectivity to a preferred RAT. For purposes of explanation, it will be assumed that the preferred RAT is NR, and an example of a non-preferred RAT is 4G such as LTE. That is, between a first or preferred RAT (e.g., NR) and a second or non-preferred RAT (e.g., LTE), the method 300 allows connectivity to the preferred RAT (e.g., NR connectivity) be available to the UE as much as possible. In method 300, it may be assumed that the network node is acting as a current serving cell to the UE. Also, the network node may be an LTE only cell, may be an NR cell, or may be an ENDC LTE cell. An ENDC LTE cell may be an LTE cell capable of co-working with an NR cell. For example, an ENDC LTE cell may be able to provide NR connectivity through another NR cell when the UE is connected to the ENDC LTE cell.

Unless otherwise indicated, an NR connectivity capable cell may refer to an NR SA cell, a cell capable of NR and one or more other RATS, and/or a cell (such as an ENDC LTE cell) that is capable of providing NR connectivity through another NR cell. More generally, a cell that is preferred RAT connectivity capable may refer to a cell that is capable of operating in the preferred RAT only, may refer to a cell that is capable of operating in the preferred RAT and one or more other RATs, or may refer to a cell that is able to provide connectivity to a preferred RAT cell. More succinctly, a preferred RAT connectivity capable cell may refer to a preferred RAT capable cell or to a cell capable of providing connectivity to a preferred RAT capable cell.

In block 305, a network node (e.g., a serving cell) may determine one or more reselection parameters that define biases to favor connectivity of the UE to a cell capable of a preferred RAT connectivity over a cell not capable of the preferred RAT connectivity. In other words, the reselection parameters may favor connectivity of the UE to a preferred RAT connectivity capable cell over a non-preferred RAT connectivity capable cell. For example, the reselection parameters may define biases to favor connectivity of the UE to an NR cell (SA or NSA) over an LTE only cell. Alternatively or in addition thereto, the reselection parameters may favor connectivity to an ENDC LTE cell over an LTE only cell. That is, dual-connectivity capable cells may be prioritized over non-dual-connectivity capable cells. More generically, multi-connectivity capable cells may be prioritized over non-multi-connectivity cells. It should be noted that the dual-connectivity capable cells are capable of providing NR connectivity. More generically, multi-connectivity capable cells are capable of providing preferred RAT connectivity.

In block 315, the network node may send the reselection parameters to the UE, e.g., in one or more reselection configuration messages such as in EFS messages. In block 320, the UE may receive the reselection parameters. Note that block 320 may be optional in that the UE may be configured with the reselection parameters, e.g., in the UE memory. Even when the UE is already configured with the reselection parameters, if the reselection parameters are received from the network node, the existing reselection parameters in the UE may be replaced or otherwise updated with the received parameters.

In block 330, it may be assumed that the UE is in idle mode and is camped on a current serving cell. It should be noted that the current serving cell that the UE is camped on need not be the same as the network node that sent the reselection parameters. That is, the UE in block 320 may receive the reselection parameters from any network node including from the current serving cell and apply the reselection parameters when camped on any cell including the current serving cell of the network. In block 330, the UE may determine whether or not to trigger cell reselection based on the one or more reselection parameters. The one or more reselection parameters may include one or more serving cell reselection offsets used to bias a cell selection value for the current serving cell as explained further below. As such, the one or more reselection parameters may include both current serving cell reselection offsets and new serving cell selection offsets.

Figure 4:
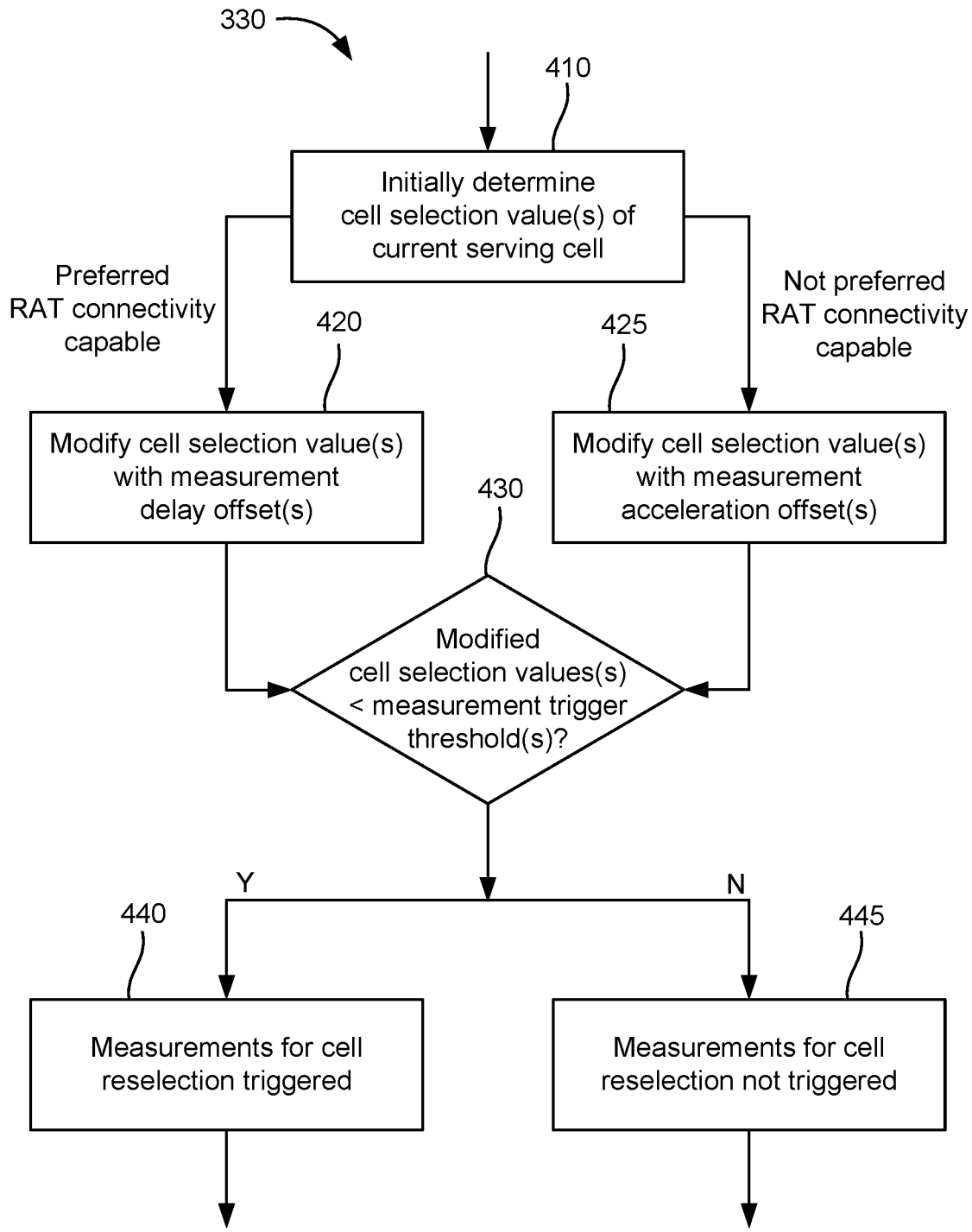
FIG. 4 illustrates a flow chart of an exemplary process performed by a UE to determine whether to trigger cell reselection in accordance with one or more aspects of the disclosure.

FIG. 4 illustrates a flow chart of an exemplary process performed by a UE to implement block 330. FIG. 4 is an example of a UE-based solution discussed above. As such, in blocks 315 and 320, the reselection parameters may be sent and received in the reselection configuration messages separate from system information block (SIB) messages used to transport S-criterion parameters, more generically, measurement criterion parameters. The reselection configuration messages enable a network operator to configure the reselection parameters in the UE. Alternatively or in addition thereto, the reselection parameters may be configured in the ULE itself, such as in the UE's memory.

In block 410, the UE may initially determine one or more cell selection values of the current serving cell based on measurements of one or more signals transmitted from the serving cell and measured at the UE. Although referred to as cell selection values, it is understood that in the context of the cell selection values determined using measurements of one or more signals transmitted form the serving cell, cell selection values may refer to values used to determine whether to start selection of a new serving cell, i.e., whether to trigger cell reselection by leaving the current serving cell and selecting a new serving cell. For simplicity, such measurements may also be referred to as serving signal measurements. The cell selection values may be determined based on one or more measurement criterion parameters such as signal strength measurements (e.g., received signal strength indicator (RSSI), reference signal received power (RSRP), etc.) and/or signal quality measurements (e.g., reference signal received quality (RSRQ), signal-to-noise ratio (SNR), signal-to-interference-plus-noise ratio (SINR), etc.). The measurement criterion parameters may further include parameters such as Qrxlevmin, Qrxlevminoffset, Pcompensation, Qqualmin, and Qqualminoffset, each of which are defined in LTE.

In an aspect, the one or more cell selection values may include parameters such as one or both of Srxlev (cell selection received level value) and Squal (cell selection quality value) as defined in LTE. Thus, in block 410, the UE may initially determine a cell selection value, e.g., SrxLev as:

$$S_{rxLev} = Q_{rxlevmeas} - (Q_{rxlevmin} + Q_{rxlevminoffset}) - P_{compensation} \quad (1)$$

and/or initially determine another cell selection value, e.g., Squal as:

$$S_{qual} = Q_{qualmeas} - (Q_{qualmin} + Q_{qualminoffset}). \quad (2)$$

In equations (1) and (2), Qrxlevmeas and Qqualmeas respectively represent measured strength and quality (e.g., in dBM) of the signals (e.g., reference signals) transmitted from the serving cell and measured at the UE as defined in LTE. In one example, Qrxlevmeas is an RSRP value and Qqualmeas is an RSRQ value.

If the current serving cell is an NR connectivity capable cell (e.g., NR or ENDC LTE) or more generally a preferred RAT connectivity capable cell, then in block 420, the UE may modify the cell selection values of the serving cell by applying one or more current serving cell reselection offsets. In one example, the serving cell reselection offsets can include one or more measurement delay offsets. As such, the measurement delay offsets may be viewed to represent modifications applied to the initially determined cell selection values when the current serving cell is NR connectivity capable. More generally, the measurement delay offsets may be applied to modify the initial cell selection values when the current serving cell is preferred RAT connectivity capable. For example, if the current serving cell an SA cell, but operates in the preferred RAT (e.g., operates in NR), then block 420 may be performed. As another example, block 420 may also be performed if the current serving cell is a multi-connectivity capable cell (e.g., is an ENDC LTE cell). The cell selection values, when modified by the measurement delay offsets, may serve to delay switching from the serving cell that is NR connectivity capable, which maximizes connectivity to the preferred RAT.

On the other hand, if the current serving cell is not NR connectivity capable, i.e., is an SA LTE cell, then in block 425, the current serving cell reselection offsets can include one or more measurement acceleration offsets such that the UE may modify the cell selection values by applying the one or more measurement acceleration offsets. As such, the measurement acceleration offsets may be viewed to represent modifications applied to the cell selection values when the current serving cell is not an NR cell and is not an ENDC LTE cell. More generally, measurement acceleration offsets may be applied when the current serving cell is not preferred RAT connectivity capable, i.e., does not operate in the preferred RAT and is not multi-connectivity capable. The cell selection values when modified by the measurement acceleration offsets may serve to accelerate switching from the serving cell that is not NR connectivity capable, which minimizes connectivity to non-preferred RAT.

In block 430, the UE may determine whether or not the modified cell selection values of the serving cell—initial cell selection values modified by the measurement delay or acceleration offsets—satisfy cell reselection criteria. In an aspect, it may be determined that the cell reselection criteria are satisfied when the modified cell selection values are less than one or more measurement trigger thresholds. If it is determined that the modified cell selection values are less than the measurement trigger thresholds ("Y" branch from block 430), then cell reselection may be triggered in block 440. Otherwise ("N" branch from block 430), in block 445, cell reselection need not be triggered.

For example, the measurement trigger thresholds may include any one or more of s-IntraSearchP, s-IntraSearchQ, s-NonIntraSearchP, and s-NonIntraSearchQ as defined in LTE. If the cell selection values include Srxlev, then in block 430, it may be determined whether the Srxlev as modified in block 420 or 425 is less than s-IntraSearchP (for intra-frequency) and/or is less than s-NonIntraSearchP (for non-intra-frequency). If the cell selection values include Squal, then in block 430, it may be determined whether Squal as modified in block 420 or 425 is less than s-IntraSearchQ (for intra-frequency) and/or is less than s-NonIntraSearchQ (for non-intra-frequency).

Note that when there are multiple cell selection values, it is contemplated that there can be multiple ways of implementing block 430. For example, at one extreme, it may be determined that condition is satisfied (i.e., "Y" branch to block 440) if at least one cell selection value is less than a corresponding measurement trigger threshold. At the other extreme, it may be determined that condition is satisfied only when all of the cell selection values are less than corresponding measurement trigger thresholds. Further, any intermediate implementations are contemplated.

The following should also be noted. Since it is desirable to maximize preferred RAT (e.g., NR) connectivity, then it would be desirable to delay triggering cell reselection to the extent possible when the UE is already connected (i.e., is camped on) to a preferred RAT connectivity capable cell (e.g., NR cell, ENDC LTE cell). Thus, in an aspect, the one or more measurement delay offsets applied to the initially determined cell selection values in block 420 may delay the triggering of cell reselection relative to using the initially determined cell selection values without modifications. In other words, relative to triggering that would occur with unmodified cell selection values, the triggering would occur later when the cell selection values are modified by applying the measurement delay offsets. As an illustration, assume the measurement delay offsets include Mdelayoffset and the cell selection value is Srxlev both expressed in dBM. If Mdelayoffset is negative, then Srxlev may be modified by subtracting Mdelayoffset from Srxlev to raise Srxlev after modification. Since the modified Srxlev is greater than the initially determined Srxlev, the condition in block 430 is less likely to hold implying that the likelihood of triggering cell reselection is reduced.

On the other hand, when the UE is camped on a cell that is not preferred RAT (e.g., not NR) connectivity capable, e.g., is legacy LTE capable only, then the cell reselection may be triggered early to enhance the chances of switching to a preferred RAT (e.g., NR, ENDC LTE) connectivity capable cell sooner. Thus, in an aspect, the one or more measurement acceleration offsets applied to the initially determined cell selection values in block 425 may accelerate the triggering of cell reselection than without modifications. In other words, relative to triggering that would occur with unmodified cell selection values, the triggering would occur earlier when the cell selection values are modified by applying the measurement acceleration offsets. As an illustration, assume the measurement acceleration offsets include Macceloffset and the cell selection value is Srxlev both expressed in dBM. If Macceloffset is negative, then Srxlev may be modified by adding Macceloffset from Srxlev to lower Srxlev after modification. Since the modified Srxlev is less than the unmodified Srxlev, the condition in block 430 is more likely to hold implying that the likelihood of triggering cell reselection is increased.

Taken together, when the cell selection values are modified by the measurement delay offsets, the triggering of the cell reselection is delayed relative to when the cell selection values are modified by the measurement acceleration offsets. To state it another way, cell reselection is delayed when the current serving cell is preferred RAT connectivity capable and is accelerated when the current serving cell is not preferred RAT connectivity capable.

In an aspect, the measurement delay and acceleration offsets may be different parameters and independently configurable. But in another aspect, one current serving cell reselection offset—e.g., a measurement offset Moffset—may be used for both. In this way, the amount of data received in the EFS messages in block 320 may be reduced.

In block 420, Moffset may be applied to raise the cell selection value, and in block 425, Moffset may be applied to lower the cell selection value.

In an aspect, the current serving cell reselection offsets—including the one or more measurement delay offsets, the one or more measurement acceleration offsets, and the one or more measurement offsets—may be received in the reselection configuration messages (e.g., EFS messages) in block 320. On the other hand, the cell selection values (e.g., Srxlev, Squal, etc.), the measurement trigger thresholds (e.g., s-IntraSearchP, s-IntraSearchQ, s-NonIntraSearchP, s-NonIntraSearchQ, etc.), and measurement criterion parameters (e.g., Qrxlevmin, Qrxlevminoffset, Pcompensation, Qqualmin, Qqualminoffset, etc.) may be defined in and/or provided in one or more SIB messages between the current serving cell and the UE separate from the reselection configuration messages. Alternatively or in addition thereto, the UE may be configured with any one or more of the one or more current serving cell reselection offsets, one or more measurement trigger thresholds, and one or more measurement criterion parameters, such as in the UE memory.

Figure 5:
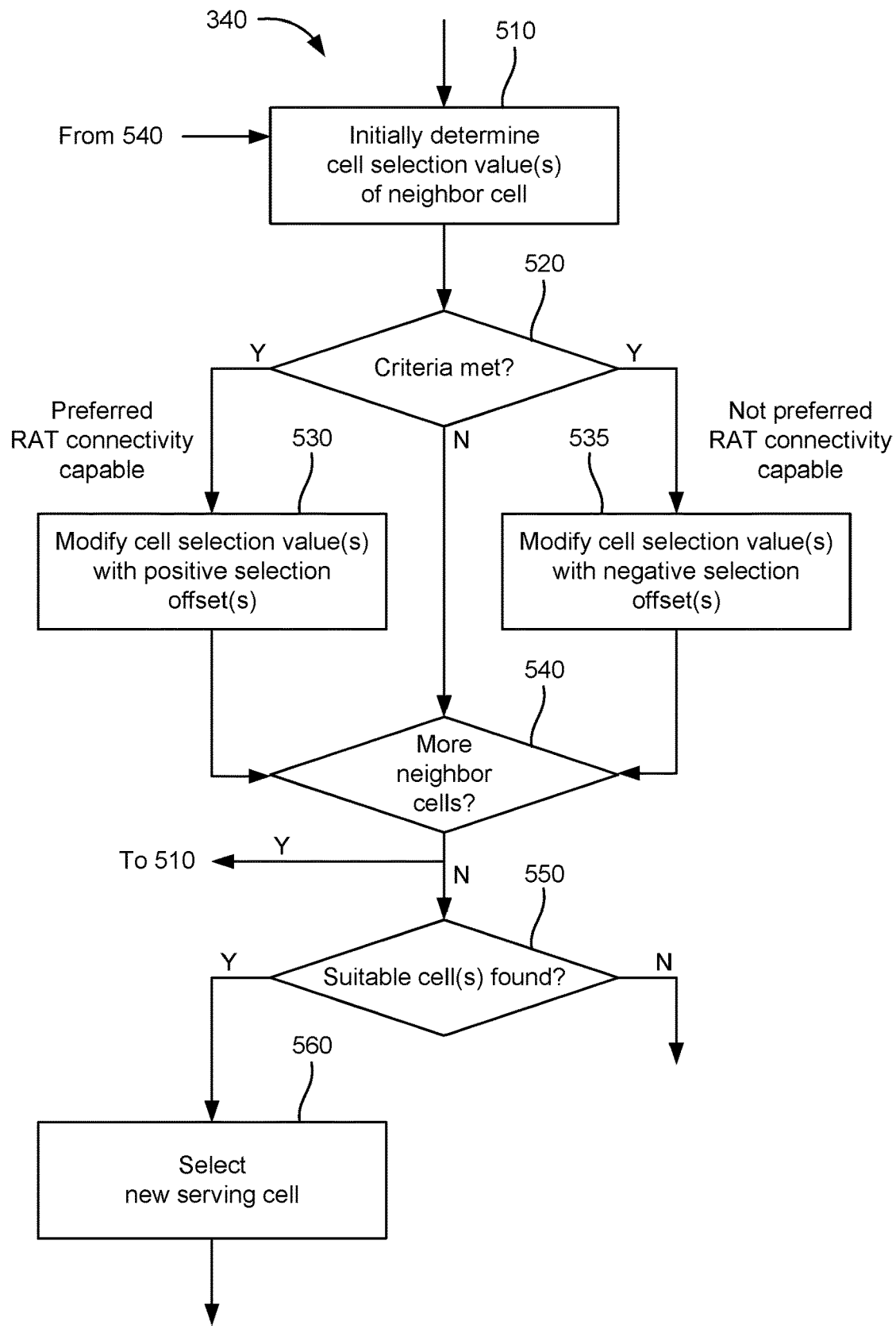
FIG. 5 illustrates a flow chart of an exemplary cell reselection process performed by a UE in accordance with one or more aspects of the disclosure.

Referring back to FIG. 3, if it is determined that the cell reselection is triggered ("Y" branch from block 330), then in block 340, the UE may determine whether a new serving cell is found. FIG. 5 illustrates a flow chart of an exemplary process performed by a UE to implement block 340 of finding a new serving cell after the cell reselection is triggered. FIG. 5 is also an example of a UE-based solution discussed above. When the cell reselection is triggered, the UE may measure signals from one or more neighbor cells to determine if any of the neighbor cells are suitable to be the new serving cell.

In block 510, the UE may initially determine one or more neighbor cell selection values of a neighbor cell based on measurements of one or more signals transmitted from the neighbor cell and measured at the UE. For simplicity, such measurements may also be referred to as neighbor signal measurements. Previously, with reference to FIG. 4, the term cell selection values was used to refer to values determined using measurements of one or more signals transmitted from the current serving cell and used to determine whether to start selection of a new serving cell, i.e., whether to trigger the cell reselection.

Here, with reference to FIG. 5, the term cell selection values is used to refer to values determined using measurements of one or more signals transmitted from neighbor cell(s) and used to help determine whether to select a given neighbor cell as a new serving cell (e.g., after cell selection or reselection has already been triggered). Cell selection values in the context of block 510 can be computed in a manner similar to that described above with reference to block 410, but using measured values of signals of neighbor cells instead of measured values of signals of the current serving cell.

In an aspect, the cell selection values of each neighbor cell may be computed in a manner similar to the cell selection values of the current serving cell. That is, the cell selection values of a neighbor cell may be one or both of Srxlev and Squal, and the cell selection values may be computed, as described above, based on any combination of parameters Qrxlevmin, Qrxlevminoffset, Pcompensation, Qqualmin, and Qqualminoffset. Thus, the cell selection values may be initially determined through equations (1) and/or (2) described above.

In block 520, the UE may determine whether or not the neighbor cell meets criteria for possibly being selected as the new serving cell. In other words, the UE may determine whether or not the neighbor cell is a candidate cell. For example, it may be required that one or both of (unmodified) Srxlev and Squal of the neighbor cell under equations (1) and/or (2) evaluate to be greater than zero, i.e., meet the selection criterion (S-criterion). More generally, it may be required that the signals from the neighbor cell meet some minimum selection thresholds of strengths and/or qualities.

If the criteria is not met ("N" branch from block 520), the UE may proceed to block 540. In this way, any neighbor cell whose connection thereto is suspect can be removed from consideration. On the other hand, the criteria is met ("Y" branch from block 520), the UE may proceed to block 530 or 535 depending on whether the neighbor cell is preferred RAT connectivity capable (e.g., NR, ENDC LTE) or not. In an aspect, block 520 may be optional. That is, each neighbor cell may be considered to be a candidate cell, and the UE may proceed to block 530 or 535 directly from block 510. At block 530 and/or 535, new serving cell selection offsets may be applied to favor connectivity of the UE to a preferred RAT connectivity capable cell over a non-preferred RAT connectivity capable cell. As will be described below, the new serving cell selection offsets can include one or more positive selection offsets and/or one or more negative selection offsets which may be applied depending upon whether a given neighbor cell is preferred RAT connectivity capable or not preferred RAT connectivity capable.

If the neighbor cell is a non-standalone (NSA) cell, e.g., is ENDC capable, then in block 530, the UE may modify the one or more cell selection values of the neighbor cell by applying one or more positive selection offsets to the neighbor cell selection values. In an aspect, if the neighbor cell is an SA cell, but operates in the preferred RAT (e.g., operates in NR), then block 530 may also be performed. As such, the one or more positive selection offsets may be viewed to represent one or more modifications applied to the one or more neighbor cell selection values when the neighbor cell is NR connectivity capable. More generally, the one or more positive selection offsets may be applied to modify the one or more neighbor cell selection values when the neighbor cell is preferred RAT connectivity capable. The one or more neighbor cell selection values when modified by the one or more positive selection offsets may increase the likelihood of the NR connectivity capable neighbor cell being selected as the new serving cell, which maximizes connectivity to the preferred RAT. As will be demonstrated further below, between an ENDC LTE neighbor cell and a non-ENDC LTE neighbor cell whose unmodified neighbor cell selection values are substantially equal, one or more selection thresholds may be such that the ENDC LTE neighbor cell is more likely to be selected as the new serving cell.

On the other hand, if the neighbor cell is not NR connectivity capable, i.e., is an SA LTE cell, then in block 535, the UE may modify the one or more neighbor cell selection values by applying one or more negative selection offsets to the neighbor cell selection values. As such, the one or more negative selection offsets may be viewed to represent modifications applied to the one or more neighbor cell selection values when the neighbor cell is not an NR cell and is not an ENDC LTE cell. More generally, one or more negative selection offsets may be applied to modify the one or more neighbor cell selection values when the neighbor cell is not preferred RAT connectivity capable, i.e., does not operate in the preferred RAT and is not multi-connectivity capable. The one or more neighbor cell selection values when modified by the one or more negative selection offsets may decrease the likelihood of the non-preferred RAT connectivity capable neighbor cell being selected as the new serving cell, which minimizes connectivity to the non-preferred RAT.

In block 540, the UE may determine whether there are more neighbor cells to evaluate. If so ("Y" branch from block 540), the UE may proceed to block 510. In this way, when there are multiple neighbor cells, each of them may be evaluated. If there are no more neighbor cells to evaluate ("N" branch from block 540), the UE in block 550 may determine whether any of the candidate cells are suitable to be the new serving cells. The suitability may be determined based on the modified one or more neighbor cell selection values.

In one aspect, instead of applying the criteria for possibly being selected as the new serving cell in block 520, the selection criterion may be applied in block 550 to select the suitable cells from pruning the candidate cells. In another aspect, only the neighbor cells whose modified cell selection values are greater than the modified cell selection values of the current serving cell may be deemed to be suitable. For example, it may be determined that the neighbor cell is suitable when modified the Srxlev of the neighbor cell is greater than the modified Srxlev of the current serving cell and/or the modified Squal of the neighbor cell is greater than the modified Squal of the current serving cell. If no suitable cell is found ("N" branch from block 550), no cell reselection takes place.

However, if at least one suitable cell is found ("Y" branch from block 550), the UE in block 560 may select a new serving cell among the suitable cells. In one aspect, each multi-connectivity capable (e.g., ENDC LTE) neighbor cell may be prioritized over all not preferred RAT (e.g., non-ENDC LTE) neighbor cells. That is, if there is at least one suitable cell that is ENDC capable, it may be prioritized to be selected over any suitable cell that is not ENDC capable. More generally, if there is at least one suitable cell that is multi-connectivity capable, it may be prioritized over any cell that is not multi-connectivity capable. Even more generally, if there is at least one suitable cell that is preferred RAT connectivity capable, it may be prioritized to be selected over any suitable cell that is not preferred RAT connectivity capable.

In another aspect, it may be possible for a not preferred RAT (e.g., non-ENDC) capable neighbor cell to be selected over a preferred RAT (e.g., an NR capable, an ENDC-capable) neighbor cell. However, a prioritization bias may be applied to the neighbor cell selection values to favor the preferred RAT connectivity capable cells over the non-preferred RAT connectivity capable cells. In this aspect, for a non-preferred RAT connectivity capable cell to be selected over a preferred RAT connectivity capable cell, the non-preferred RAT connectivity capable cell must overcome the prioritization bias. For example, priorityoffsetP (priorityoffsetQ) may be defined such that Srxlev (Squal) of a non-preferred capable cell must be greater than Srxlev+priorityoffsetP (Squal+priorityoffsetQ) of a preferred RAT connectivity capable cell for the non-preferred RAT connectivity capable cell to be selected. This is simply a recognition that in order to forego connectivity to the preferred RAT, there should be some other benefit.

In an aspect, the positive and negative selection offsets applied in blocks 530 and 535 may bias the selection priority of the neighbor cells in a manner similar to manner in which the measurement delay and acceleration offsets applied in blocks 420 and 425 bias determining whether or not the cell reselection trigger is delayed or accelerated. That is, the positive (negative) selection offsets applied to the neighbor cell selection values in block 530 (535) may modify the neighbor cell selection values to enhance (reduce) the likelihood of the preferred RAT connectivity capable (non-preferred RAT connectivity capable) neighbor cell to be selected as the new serving cell then without the application of the positive (negative) selection offsets. As mentioned above, this implies that between a preferred RAT (e.g., an NR, an ENDC LTE) neighbor cell and a non-preferred RAT (e.g., non-ENDC LTE) neighbor cell whose unmodified neighbor cell selection values are more or less equal, the preferred RAT neighbor cell is more likely to be selected as the new serving cell.

In an aspect, the positive and negative selection offsets may be different parameters and independently configurable. But in another aspect, the new serving cell selection offset can comprise one parameter—e.g., a selection offset—which may be used for both. In this way, the amount of data received in the reselection configuration messages in block 320 may be received. In block 530, the selection offset may be applied to raise the neighbor cell selection value, and in block 535, the selection offset may be applied to lower the neighbor cell selection value.

Referring back to FIG. 3, if it is determined that the new serving cell is found ("Y" branch from block 340), then in block 340, the UE may connect to, e.g., camp on, the new serving cell.

Figure 6:
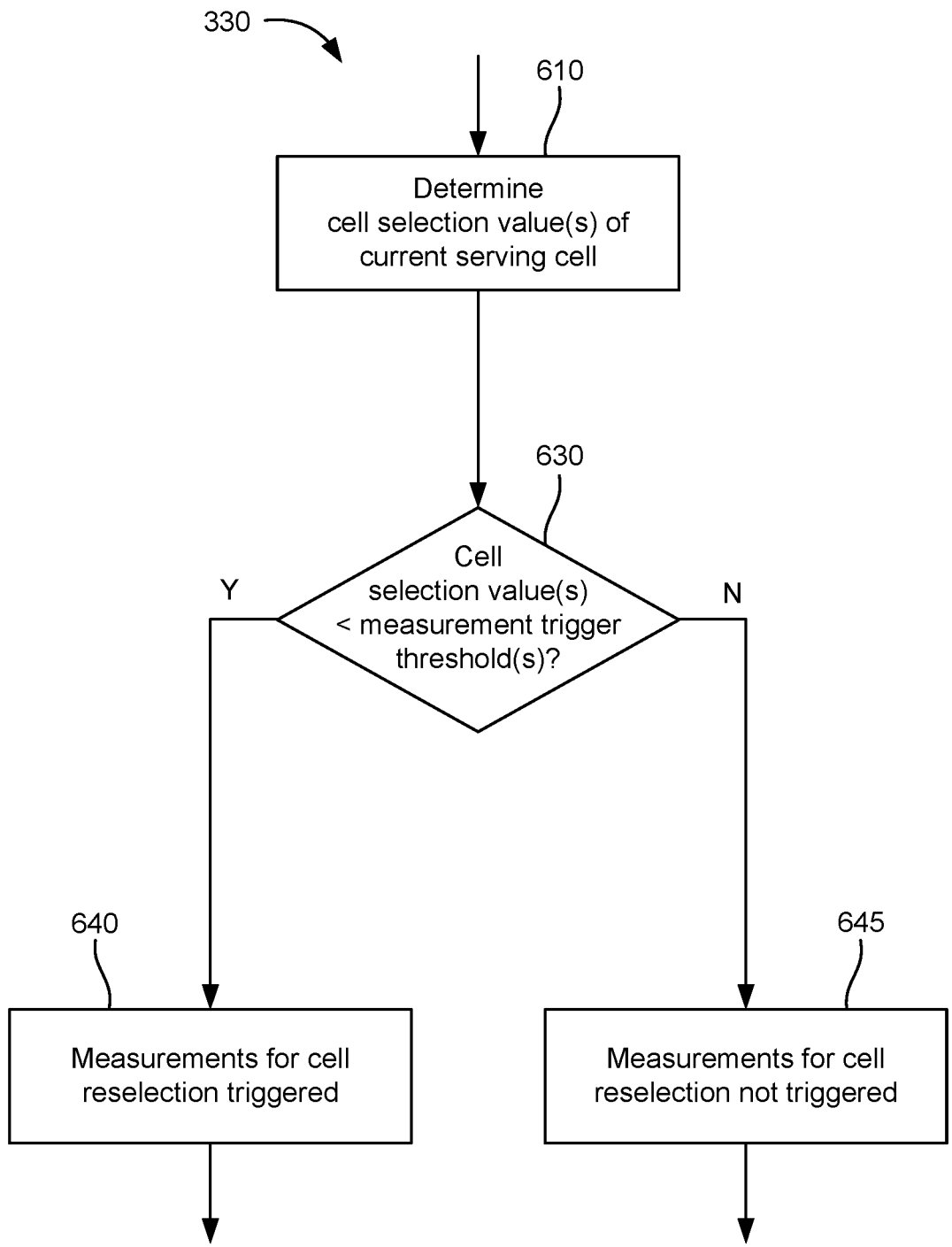
FIG. 6 illustrates a flow chart of another exemplary process performed by a UE to determine whether to trigger cell reselection in accordance with one or more aspects of the disclosure.

FIG. 6 illustrates a flow chart of another exemplary process performed by a UE to implement block 330. FIG. 6 is an example of a network-assisted solution. In the network-assisted solution, one or more network configured evaluation offsets and/or one or more network configured selection thresholds received from the network node in block 320 may be used. The reselection parameters may include the evaluation offsets and/or the measurement criterion parameters may include the selection thresholds. Again, it is noted that the current serving cell can be, but need not be, the same as the network node that sends the reselections parameters.

In block 610, the UE may determine one or more cell selection values of the current serving cell based on the serving signal measurements, i.e., based on one or more measurements at the UE of one or more signals transmitted from the current serving cell. The cell selection values may also be determined based on the evaluation offsets. In this instance, the UE may calculate the cell selection values directly from the information provided in the SIB messages. For example, the UE may determine a cell selection value, e.g., SrxLev as:

$$S_{rxLev} = Q_{rxlevmeas} - (Q_{rxlevmin} + Q_{rxlevminoffset}) - P_{compensation} + ENDC_{offset} \quad (3)$$

and another cell selection value, e.g., Squal as:

$$S_{qual} = Q_{qualmeas} - (Q_{qualmin} + Q_{qualminoffset}) + ENDC_{offset}. \quad (4)$$

It may be assumed that when the current serving cell is preferred RAT connectivity capable (e.g., NR, ENDC LTE), equations (3) and/or (4) may be used to determine the cell selection values. However, when the current serving cell is not preferred RAT connectivity capable, then it may be assumed that the cell selection values may be determined according to equations (1) and/or (2). In equations (3) and (4), the one or more evaluation offsets may include ENDCoffset.

In block 630, the UE may determine whether or not the one or more cell selection values are less than the one or more measurement trigger thresholds. Block 630 may be similar to block 430. If in block 630 it is determined that the cell selection values are less than the measurement trigger thresholds, then cell reselection may be triggered in block 640. Otherwise, in block 645, cell reselection need not be triggered.

The one or more evaluation offsets (e.g., ENDCoffset) may be configured by the network such that when the one or more cell selection values are determined based, at least in part, on the one or more evaluation offsets, the triggering of the cell reselection is delayed relative to when the one or more cell selection values are not determined based on the one or more evaluation offsets. For example, for the current serving cell, Srxlev determined under equation (3) may be less than the same had it been determined under equation (1) and/or Squal determined under equation (4) may be less than the same had it been determined under equation (2).

In this network-assisted process to implement block 330, if the current serving cell is preferred RAT connectivity capable, then biasing to delay triggering of the cell reselection is accomplished in block 610 by applying the evaluation offsets (e.g., ENDCoffset) when determining the cell selection values. Alternatively or in addition thereto, if the current serving cell is not preferred RAT connectivity capable, then biasing to accelerate triggering of the cell reselection may be accomplished by applying the evaluation offset (e.g., ENDCoffset) the other way when determining the cell selection values. For example, for the current serving cell that is not preferred RAT connectivity capable, ENDCoffset may be applied so that resulting Srxlev would be greater than the same had it been determined under equation (1) and/or resulting Squal would be greater than the same had it been determined under equation (2).

Figure 7:
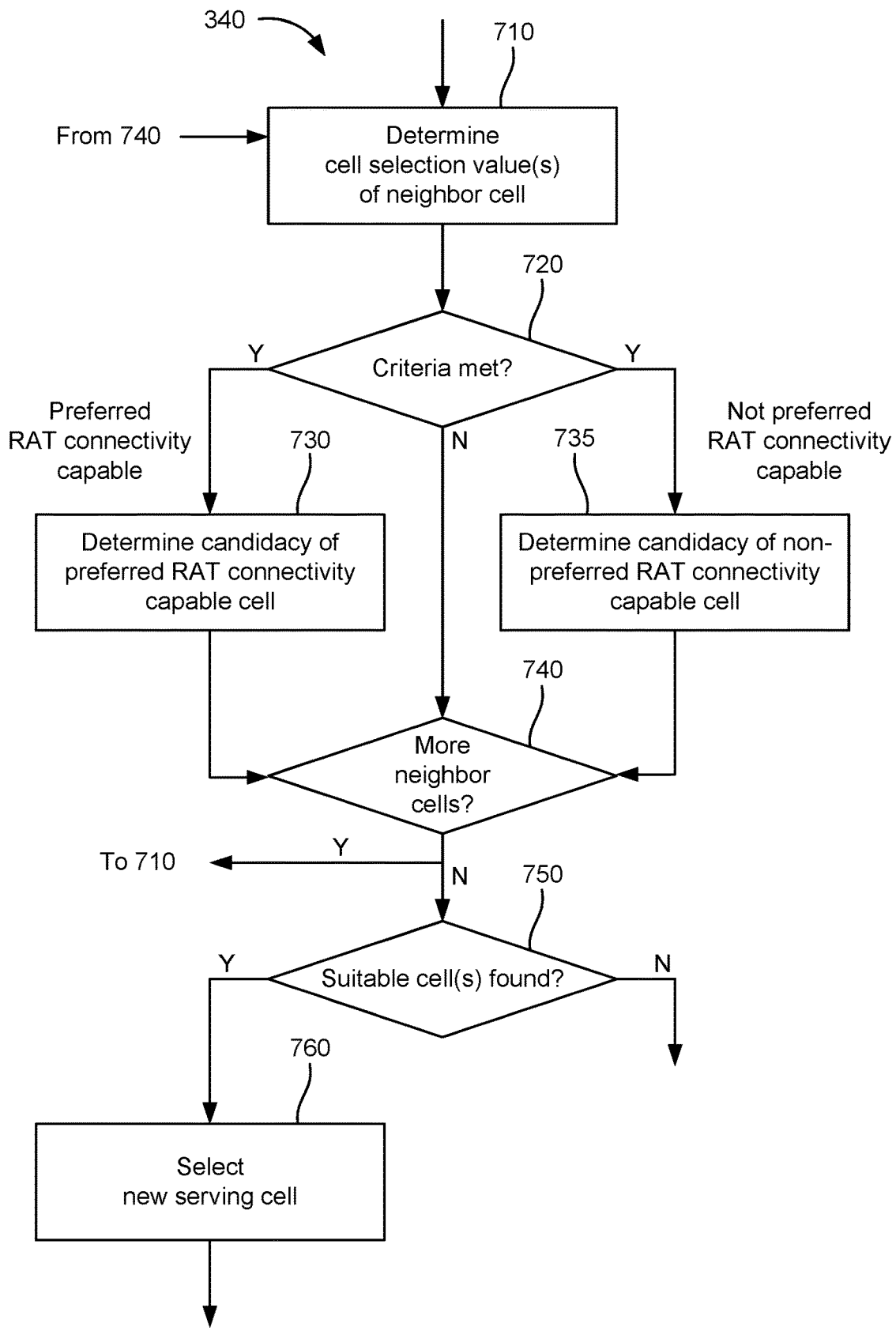
FIG. 7 illustrates a flow chart of another exemplary cell reselection process performed by a UE in accordance with one or more aspects of the disclosure.

FIG. 7 illustrates a flow chart of another exemplary process performed by a UE to implement block 340. FIG. 7 is also an example of the network-assisted solution. When the cell reselection is triggered, the UE may measure signals from one or more neighbor cells to determine if any of the neighbor cells are suitable to be the new serving cell.

In block 710, the UE may determine one or more cell selection values of a neighbor cell based on one or more measurements at the UE of one or more signals transmitted from the neighbor cell. The cell selection values of the neighbor cell may also be determined based on one or more measurement criterion parameters and based on one or more selection offsets, which may be parts of the reselection parameters. If the neighbor cell is preferred RAT connectivity capable, equations (3) and/or (4) may be used. That is, the one or more neighbor cell selection values may be determined based on one or more evaluation offsets such as ENDCoffset. Otherwise, equations (1) and/or (2) may be used. More broadly, if the neighbor cell is preferred RAT connectivity capable, then the one or more neighbor cell selection values may be determined based on the one or more measurement criterion parameters and the one or more evaluation offsets. If the neighbor cell is not preferred RAT connectivity capable, then the neighbor cell selection values may be determined without consideration of the evaluation offsets.

In block 720, the UE may determine whether or not a neighbor cell meets the criteria for possibly being the new serving cell. In other words, the UE may determine whether or not the neighbor cell is a candidate cell. For example, it may be required that one or both of Srxlev and Squal of the neighbor cell under equations (1) and/or (2) (for non-preferred RAT connectivity cells) or under equations (3) and/or (4) (for preferred RAT connectivity cells) evaluate to be greater than zero, i.e., meet the selection criterion (S-criterion). More generally, it may be required that the signals from the neighbor cell meet some minimum threshold of strength and/or quality.

If the criteria is not met ("N" branch from block 720), the UE may proceed to block 740. In this way, any neighbor cell whose connection thereto is suspect can be removed from consideration. On the other hand, the criteria is met ("Y" branch from block 720), the UE may proceed to block 730 or 735 depending on whether the neighbor cell is preferred RAT connectivity capable or not. In an aspect, block 720 may be optional.

In block 730, the UE may determine whether or not the neighbor cell is a candidate cell using the one or more selection thresholds including one or both of ThreshX-ENDCP and ThreshXENDCQ. In this context, the ThreshX-ENDCP may represent a target strength threshold of the neighbor cell selection values of each neighbor cell that is preferred RAT connectivity capable. Also, the ThreshX-ENDCQ may represent a target quality threshold of the neighbor cell selection values of each neighbor cell that is preferred RAT connectivity capable. Thus, in block 730, the neighbor cell may be considered a candidate when the neighbor cell selection values (e.g., Srxlev, Squal) of the neighbor cell are greater than the selection thresholds. The selection thresholds may be included in the SIB messages. In another aspect, in block 730, the UE may not filter at all.

In block 735, the UE may apply filtering to determine candidacy of non-preferred RAT connectivity capable (e.g., non-ENDC capable) neighbor cells. Alternatively, UE may not apply any filtering. In block 740, the UE may determine whether there are more neighbor cells to evaluate. If so ("Y" branch from block 740), the UE may proceed to block 710. In this way, when there are multiple neighbor cells, each of them may be evaluated.

If there are no more neighbor cells to evaluate ("N" branch from block 740), the UE in block 750 may determine whether any of the candidate cells are suitable to be the new serving cells. In block 760, the UE may select a new serving cell among the suitable cells. In an aspect, between a neighbor cell that is preferred RAT (e.g., NR, ENDC) connectivity capable and another neighbor cell that is not preferred RAT connectivity capable having equal one or more neighbor cell selection values, the selection threshold is such that the preferred RAT connectivity capable neighbor cell is more likely to be selected as the new serving cell. Blocks 750 and 760 may be respectively similar to blocks 550 and 560.

In this network-assisted process to implement block 340, if a neighbor cell is preferred RAT connectivity capable, then biasing to enhance the likelihood of the neighbor cell being selected as the new serving cell is accomplished in block 710 by applying the evaluation offsets (e.g., END-Coffset) when determining the cell selection values. Alternatively or in addition thereto, if the neighbor cell is not preferred RAT connectivity capable, then biasing to reduce the likelihood of the neighbor cell being selected as the new serving cell may be accomplished by applying the evaluation offset (e.g., ENDCoffset) the other way when determining the cell selection values. For example, for the neighbor cell that is not preferred RAT connectivity capable, END-Coffset may be applied so that resulting Srxlev would be greater than the same had it been determined under equation (1) and/or resulting Squal would be greater than the same had it been determined under equation (2). When biasing is applied in block 710, this implies that blocks 730 and 735 may be the same.

It is seen that the reselection parameters (e.g., one or more measurement offsets, one or more measurement delay offsets, one or more measurement acceleration offsets, one or more selection offsets, one or more positive selection offsets, one or more negative selection offsets, etc.) can play roles in determining when to trigger cell reselection. If the current serving cell is (is not) preferred RAT connectivity capable, the reselection parameters serve to delay (accelerate) the triggering of cell reselection. The reselection parameters can also play roles in determining candidacy/suitability of neighboring cells once the cell reselection is triggered. If a neighbor cell is (is not) preferred RAT connectivity capable, the reselection parameters serve to increase (decrease) likelihood of the neighbor cell being selected as the new serving cell.

The reselection parameters, whether provided in reselection configuration messages apart from SIB messages (as in UE-based) or provided in the SIB messages (as in network-assisted), may be determined by network operators offline. For example, statistics may be gathered on the network. Alternatively or in addition thereto, the reselection parameters may be determined through minimization of drive test (MTD) reports.

Note that the concepts described above for cell reselection can be readily extended to handovers in which measurement objects and events may include knowledge of ENDC support for a cell to prioritize that cell amongst other cells. For example, if the UE is in active communication with a preferred RAT (e.g., 5G, ENDC) capable cell, then triggering of the handover from that serving cell may be delayed to the extent possible. On the other hand, if the UE is in active communication with a non-preferred RAT connectivity capable cell (e.g., LTE only), then triggering of the handover from that serving cell may be accelerated to the extent possible. Also, when a handover decision is made, selection process may be biased to favor handovers to 5G/ENDC LTE cells over LTE only cells.

An example solution to address handover issues may be on the network side in which a cell (e.g., gNB, ENDC capable eNB) may indicate ENDC support/capability for that cell in the configured measurement object. In one option, the serving cell may use the ENDC capability information for that cell and use favorable thresholds for 5G/ENDC capable cells relative to non-ENDC capable cells. This may imply that handing over to a non-ENDC capable cell would occur only when it is better than an ENDC capable cell above a configured threshold. In another option, the serving cell may indicate a handover offset (e.g., END-Coffset) to the UE in the measurement object. The UE may use the handover offset to trigger the event early ENDC capable cells so as to prioritize ENDC capable cells for handover.

FIG. 8 illustrates an example way a measurement object may be modified. Note the highlighted portions of the measurement object. In FIG. 8, "ENDC support" may be used to indicate whether a cell is ENDC capable. Also, "ENDC offset" may be used to indicate the amount of handover offset.

In yet another option, the existing measurement objects and event reports need not be modified. Instead, the network may simply configure the handover offset in any radio resource control (RRC) signaling, which may be used to bias the ENDC capable cell's measurements. For example, if the current serving cell is ENDC capable, then handover to a non-ENDC capable cell may occur only when the non-ENDC capable cell is better by a threshold amount, e.g., better than (currentThreshold+ENDChandoveroffset). On the other hand, if the current serving cell is not ENDC capable, then handover to an ENDC capable cell may occur even when the ENDC capable cell is better by only a small amount, e.g., better than (currentThreshold−ENDChandoveroffset). In an aspect, the techniques described above and illustrated in FIGS. 3-7 for cell reselection may be adapted to maximize connections to 5G/ENDC capable cells during handovers.

Figure 9:
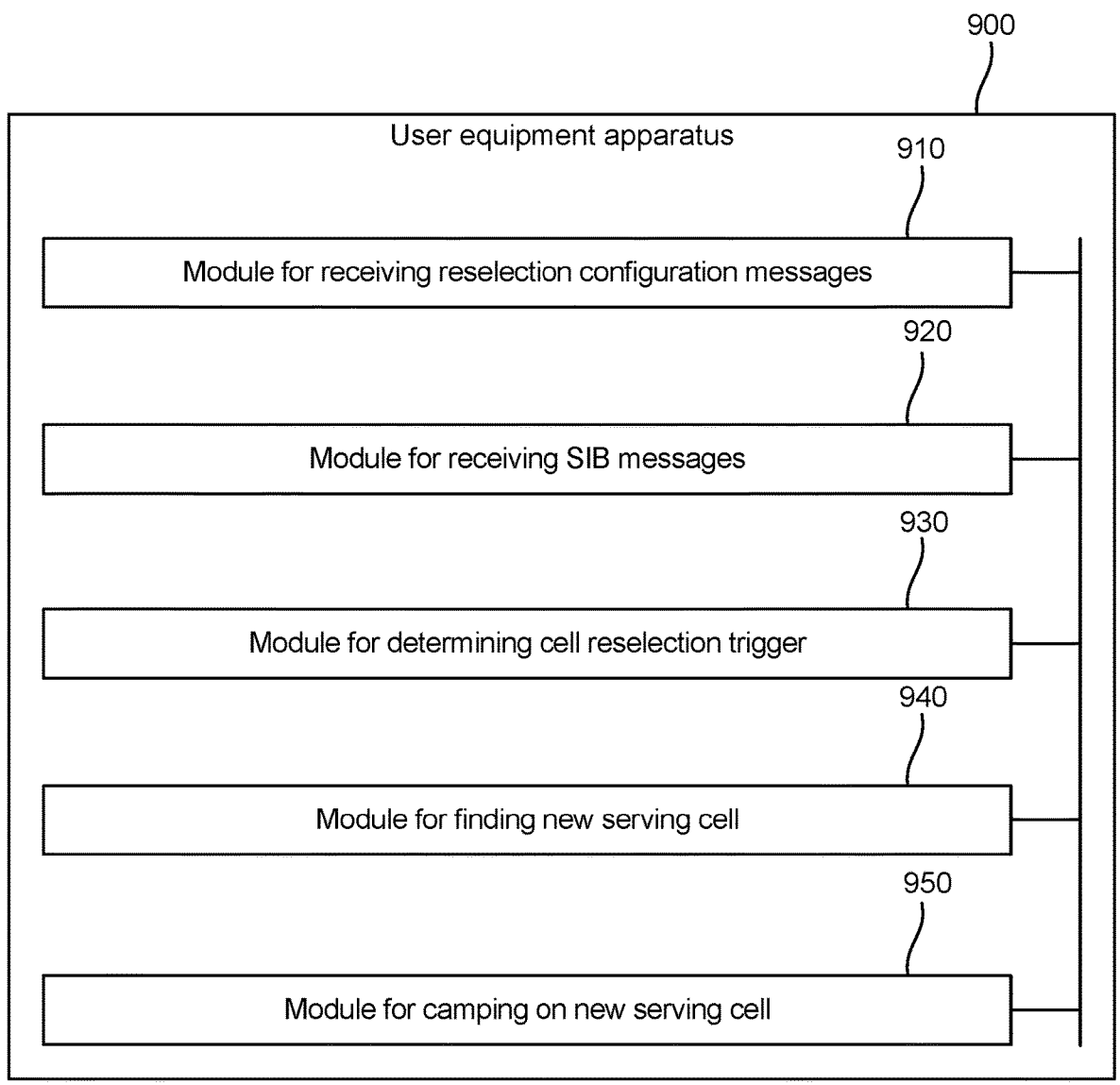
FIGS. 9 and 10 illustrate simplified block diagrams of several sample aspects of apparatuses configured to support cell reselections and handovers.

FIG. 9 illustrates an example user equipment apparatus 900 represented as a series of interrelated functional modules connected by a common bus. Each of the modules may be implemented in hardware or as a combination of hardware and software. For example, the modules may be implemented as any combination of the modules of the apparatus 202 of FIG. 2. A module for receiving reselection configuration messages 910 (e.g., to receive reselection parameters) may correspond at least in some aspects to a communication device, such as the communication device 208 and/or a processing system, such as processing system 232. A module for receiving SIB messages 920 may correspond at least in some aspects to a communication device, such as the communication device 208 and/or a processing system, such as processing system 232. A module for determining cell reselection trigger 930 may correspond at least in some aspects to a processing system, such as processing system 232. A module for finding new serving cell 940 may correspond at least in some aspects to a processing system, such as processing system 232. A module for camping on the new serving cell 950 a communication device, such as the communication device 208 and/or a processing system, such as processing system 232.

Figure 10:
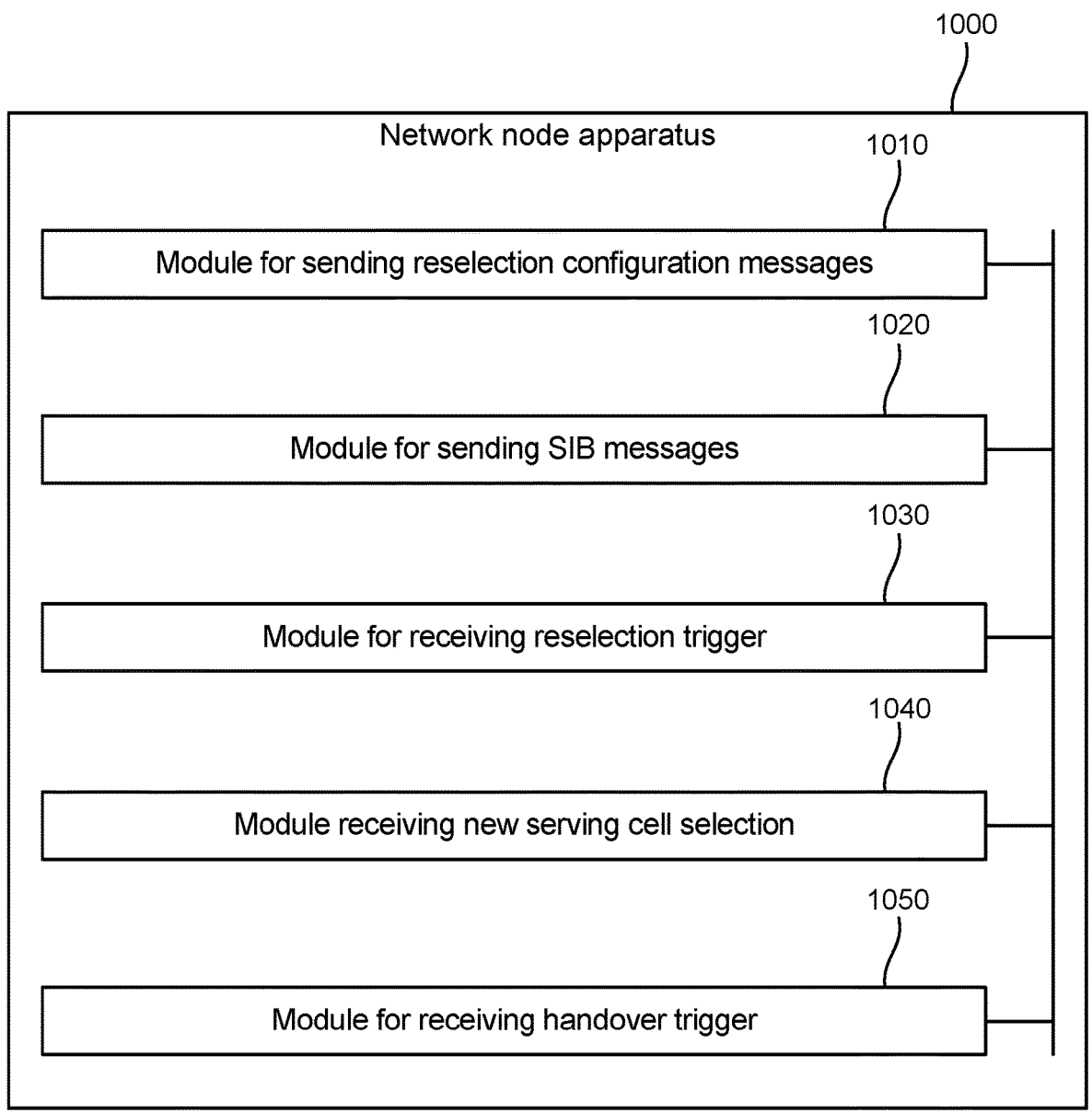

FIG. 10 illustrates an example network node apparatus 1000 represented as a series of interrelated functional modules connected by a common bus. Each of the modules may be implemented in hardware or as a combination of hardware and software. For example, the modules may be implemented as any combination of the modules of the apparatus 204 of FIG. 2. A module for sending reselection configuration messages 1010 may correspond at least in some aspects to a communication device, such as the communication device 214 and/or a processing system, such as processing system 234. A module for sending SIB messages 1020 may correspond at least in some aspects to a communication device, such as the communication device 214 and/or a processing system, such as processing system 234. A module for receiving selection trigger 1030 may correspond at least in some aspects to a communication device, such as the communication device 214 and/or a processing system, such as processing system 234. A module for receiving new serving cell selection 1040 may correspond at least in some aspects to a communication device, such as the communication device 214 and/or a processing system, such as processing system 234. A module for receiving handover trigger 1050 may correspond at least in some aspects to a communication device, such as the communication device 214 and/or a processing system, such as processing system 234.

The functionality of the modules of FIGS. 9 and 10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 9 and 10, as well as other components and functions described herein, may be implemented using any suitable means. Such means also may be implemented, at least in part, using corresponding structure as taught herein. For example, the components described above in conjunction with the "module for" components of FIGS. 9 and 10 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a network node of a network serving a user equipment (UE), the method comprising:
    determining one or more reselection parameters defining biases to favor connectivity of the UE to a preferred radio access technology (RAT) connectivity capable cell over a non-preferred RAT connectivity capable cell when the UE performs a cell reselection from a current serving cell to a new serving cell, the one or more reselection parameters including one or more current serving cell reselection offsets and one or more new serving cell selection offsets; and
    sending to the UE the one or more reselection parameters in one or more reconfiguration messages,
    wherein the one or more reselection parameters are determined offline and/or determined based on minimization of drive test (MTD) reports,
    wherein a preferred RAT connectivity capable cell refers to a preferred RAT capable cell or to a cell capable of providing connectivity to a preferred RAT capable cell, and
    wherein when the current serving cell is not a preferred RAT connectivity capable cell, triggering of cell reselection is accelerated when the one or more current serving cell reselection offsets are considered than when the one or more current serving cell reselection offsets are not considered.

2. The method of claim 1, wherein the preferred RAT connectivity capable cell is 5G New Radio (NR) capable or is EUTRA NR dual connectivity (ENDC) capable.

3. A method, performed by a network node of a network serving a user equipment (UE), the method comprising:
    determining one or more reselection parameters defining biases to favor connectivity of the UE to a preferred radio access technology (RAT) connectivity capable cell over a non-preferred RAT connectivity capable cell when the UE performs a cell reselection from a current serving cell to a new serving cell, the one or more reselection parameters including one or more current serving cell reselection offsets and one or more new serving cell selection offsets; and
    sending to the UE the one or more reselection parameters in one or more reconfiguration messages,
    wherein the one or more reselection parameters are determined offline and/or determined based on minimization of drive test (MTD) reports,
    wherein a preferred RAT connectivity capable cell refers to a preferred RAT capable cell or to a cell capable of providing connectivity to a preferred RAT capable cell,
    wherein the one or more current serving cell reselection offsets comprise one or more measurement delay offsets and/or one or more measurement acceleration offsets,
        one or more cell selection values of the current serving cell being initially determined based on one or more measurements at the UE of one or more signals transmitted from the current serving cell and based on one or more measurement criterion parameters,
        the one or more initially determined cell selection values of the current serving cell being modified by the one or more measurement delay offsets when the current serving cell is preferred RAT connectivity capable;
        the one or more initially determined cell selection values of the current serving cell being modified by the one or more measurement acceleration offsets when the current serving cell is not preferred RAT connectivity capable,
        cell reselection being triggered when the one or more modified cell selection values are less than one or more measurement trigger thresholds, and
    wherein when the one or more initial cell selection values of the current serving cell are modified by the measurement delay offset, the triggering of the cell reselection is delayed relative to when the one or more initial cell selection values of the current serving cell are modified by the measurement acceleration offset.

4. The method of claim 3,
    wherein the one or more measurement criterion parameters are sent to the UE in one or more system information block (SIB) messages separate from sending the one or more reselection configuration messages, wherein the one or more measurement criterion parameters comprise any one or more of Qrxlevmin, Qrxlevminoffset, PCompensation, Qqualmin, and Qqualminoffset, wherein the one or more measurement trigger thresholds comprise any one or more of s-IntraSearchP, s-IntraSearchQ, s-NonIntraSearchP, and s-NonIntraSearchQ, and wherein the one or more cell selection values comprise one or both of SrxLev and Squal.

5. The method of claim 1, wherein the one or more new serving cell selection offsets comprise one or more positive selection offsets and one or more negative selection offsets applied to one or more neighbor cell selection values of one or more neighbor cells when the cell reselection is triggered, for each neighbor cell, one or more cell selection values of that neighbor being initially determined at the UE based on one or more measurements at the UE of one or more signals from that neighbor cell and based on one or more measurement criterion parameters, for each neighbor cell that is preferred RAT connectivity capable, the one or more positive selection offsets representing one or more modifications applied to the one or more initially determined cell selection values of that neighbor cell, for each neighbor cell that is not preferred RAT connectivity capable, the one or more negative selection offset representing one or more modifications applied to the one or more initially determined cell selection values of that neighbor cell, wherein for each neighbor cell that is preferred RAT connectivity capable, a likelihood of that neighbor cell being selected as the new serving cell is enhanced with application of the one or more positive selection offsets to the one or more cell selection values of that neighbor cell than without application of the one or more positive selection offsets, and wherein for each neighbor cell that is not preferred RAT connectivity capable, a likelihood of that neighbor cell being selected as the new serving cell is reduced with application of the one or more negative selection offsets to the one or more cell selection values of that neighbor cell than without application of the one or more negative selection offsets.

6. The method of claim 5, wherein each neighbor cell that is preferred RAT connectivity capable is prioritized to be selected as the new serving cell over each neighbor cell that is not preferred RAT connectivity capable.

7. A method of claim 1, performed by a network node of a network serving a user equipment (UE), the method comprising:

determining one or more reselection parameters defining biases to favor connectivity of the UE to a preferred radio access technology (RAT) connectivity capable cell over a non-preferred RAT connectivity capable cell when the UE performs a cell reselection from a current serving cell to a new serving cell, the one or more reselection parameters including one or more current serving cell reselection offsets and one or more new serving cell selection offsets; and sending to the UE the one or more reselection parameters in one or more reconfiguration messages, wherein the one or more reselection parameters are determined offline and/or determined based on minimization of drive test (MTD) reports, wherein a preferred RAT connectivity capable cell refers to a preferred RAT capable cell or to a cell capable of providing connectivity to a preferred RAT capable cell, wherein the one or more reselection parameters are sent in one or more system information block (SIB) messages to the UE, the one or more reselection parameters including one or more evaluation offsets representing a basis of determining one or more selection values of the current serving cell when the current serving cell is preferred RAT connectivity capable, the one or more cell selection values being determined at the UE based on one or more measurements at the UE of one or more signals transmitted from the current serving cell, based on one or more measurement criterion parameters, and based on the one or more evaluation offsets in which the one or more evaluation offsets are applied when the current serving cell is preferred RAT connectivity capable and are not applied when the current serving cell is not preferred RAT connectivity capable, and wherein when the one or more cell selection values are determined based on the one or more evaluation offsets, the triggering of the cell reselection is delayed relative to when the cell selection values are not determined based on the one or more evaluation offsets.

8. The method of claim 7, wherein the one or more evaluation offsets comprise ENDCoffset, wherein the one or more measurement criterion parameters comprise any one or more of Qrxlevmin, Qrxlevminoffset, PCompensation, Qqualmin, and Qqualminoffset, and wherein the one or more cell selection values comprise one or both of SrxLev and Squal.

9. The method of claim 1, wherein the one or more reselection parameters comprise one or more selection thresholds representing one or more thresholds for determining, for each neighbor cell that is preferred RAT connectivity capable, whether that neighbor cell is a candidate to be the new serving cell based on one or more cell selection values of that neighbor cell, the one or more neighbor cell selection values being determined at the UE based on one or more measurements at the UE of one or more signal transmitted from that neighbor cell and based on one or more measurement criterion parameters, and based on the one or more evaluation offsets in which the one or more evaluation offsets are applied when that neighbor cell is preferred RAT connectivity capable and are not applied when that neighbor cell is not preferred RAT connectivity capable, and wherein when the one or more cell selection values of a neighbor cell are determined based on the one or more evaluation offsets, a likelihood of the neighbor cell being selected as the new serving cell is increased relative to when the cell selection values are not determined based on the one or more evaluation offsets.

10. The method of claim 9, wherein each neighbor cell that is preferred RAT connectivity capable is prioritized to be selected as the new serving cell over each neighbor cell that is not preferred RAT connectivity capable.

11. A network node of a network serving a user equipment (UE), the network node comprising:
- a transceiver circuitry;
- a memory circuitry; and
- a processor circuitry,
- wherein the transceiver circuitry, the memory circuitry, and the processor circuitry are configured to:
  - determine one or more reselection parameters defining biases to favor connectivity of the UE to a multi-connectivity capable cell over a non-multi-connectivity capable cell, the one or more reselection parameters including one or more current serving cell reselection offsets and one or more new serving cell selection offsets; and
  - send to the UE the one or more reselection parameters,
- wherein the one or more reselection parameters are determined offline and/or are determined based on minimization of drive test (MTD) reports,
- wherein a preferred RAT connectivity capable cell refers to a preferred RAT capable cell or to a cell capable of providing connectivity to a preferred RAT capable cell, and
- wherein when the current serving cell is not a preferred RAT connectivity capable cell, triggering of cell reselection is accelerated when the one or more current serving cell reselection offsets are considered than when the one or more current serving cell reselection offsets are not considered.

12. The network node of claim 11, wherein the preferred RAT connectivity capable cell is 5G New Radio (NR) capable or is EUTRA NR dual connectivity (ENDC) capable.

13. The network node of claim 11,
- wherein the one or more current serving cell reselection offsets comprise one or more measurement delay offsets and/or one or more measurement acceleration offsets,
  - one or more cell selection values of the current serving cell being initially determined based on one or more measurements at the UE of one or more signals transmitted from the current serving cell and based on one or more measurement criterion parameters,
  - the one or more initially determined cell selection values of the current serving cell being modified by the one or more measurement delay offsets when the current serving cell is preferred RAT connectivity capable;
  - the one or more initially determined cell selection values of the current serving cell being modified by the one or more measurement acceleration offsets when the current serving cell is not preferred RAT connectivity capable,
  - cell reselection being triggered when the one or more modified cell selection values are less than one or more measurement trigger thresholds, and
- wherein when the one or more initial cell selection values of the current serving cell are modified by the measurement delay offset, the triggering of the cell reselection is delayed relative to when the one or more initial cell selection values of the current serving cell are modified by the measurement acceleration offset.

14. The network node of claim 13,
- wherein the one or more measurement criterion parameters are sent to the UE in one or more system information block (SIB) messages separate from sending the one or more reselection configuration messages,
- wherein the one or more measurement criterion parameters comprise any one or more of Qrxlevmin, Qrxlevminoffset, PCompensation, Qqualmin, and Qqualminoffset,
- wherein the one or more measurement trigger thresholds comprise any one or more of s-IntraSearchP, s-IntraSearchQ, s-NonIntraSearchP, and s-NonIntraSearchQ, and
- wherein the one or more cell selection values comprise one or both of SrxLev and Squal.

15. The network node of claim 11,
- wherein the one or more new serving cell selection offsets comprise one or more positive selection offsets and one or more negative selection offsets applied to one or more neighbor cell selection values of one or more neighbor cells when the cell reselection is triggered,
  - for each neighbor cell, one or more cell selection values of that neighbor being initially determined at the UE based on one or more measurements at the UE of one or more signals from that neighbor cell and based on one or more measurement criterion parameters,
  - for each neighbor cell that is preferred RAT connectivity capable, the one or more positive selection offsets representing one or more modifications applied to the one or more initially determined cell selection values of that neighbor cell,
  - for each neighbor cell that is not preferred RAT connectivity capable, the one or more negative selection offset representing one or more modifications applied to the one or more initially determined cell selection values of that neighbor cell,
- wherein for each neighbor cell that is preferred RAT connectivity capable, a likelihood of that neighbor cell being selected as the new serving cell is enhanced with application of the one or more positive selection offsets to the one or more cell selection values of that neighbor cell than without application of the one or more positive selection offsets, and
- wherein for each neighbor cell that is not preferred RAT connectivity capable, a likelihood of that neighbor cell being selected as the new serving cell is reduced with application of the one or more negative selection offsets to the one or more cell selection values of that neighbor cell than without application of the one or more negative selection offsets.

16. The network node of claim 15, wherein each neighbor cell that is preferred RAT connectivity capable is prioritized to be selected as the new serving cell over each neighbor cell that is not preferred RAT connectivity capable.

17. The network node of claim 11,
- wherein the one or more reselection parameters are sent in one or more system information block (SIB) messages to the UE, the one or more reselection parameters including one or more evaluation offsets representing a basis of determining one or more selection values of the current serving cell when the current serving cell is preferred RAT connectivity capable, the one or more cell selection values being determined at the UE based on one or more measurements at the UE of one or more signals transmitted from the current serving cell, based on one or more measurement criterion parameters, and based on the one or more evaluation offsets in which the one or more evaluation offsets are applied when the current serving cell is preferred RAT connectivity capable and are not applied when the current serving cell is not preferred RAT connectivity capable, and wherein when the one or more cell selection values are determined based on the one or more evaluation offsets, the triggering of the cell reselection is delayed relative to when the cell selection values are not determined based on the one or more evaluation offsets.

18. The network node of claim 17,
wherein the one or more evaluation offsets comprise ENDCoffset,
wherein the one or more measurement criterion parameters comprise any one or more of Qrxlevmin, Qrxlevminoffset, PCompensation, Qqualmin, and Qqualminoffset, and
wherein the one or more cell selection values comprise one or both of SrxLev and Squal.

19. The network node of claim 11,
wherein the one or more reselection parameters comprise one or more selection thresholds representing one or more thresholds for determining, for each neighbor cell that is preferred RAT connectivity capable, whether that neighbor cell is a candidate to be the new serving cell based on one or more cell selection values of that neighbor cell, the one or more neighbor cell selection values being determined at the UE based on one or more measurements at the UE of one or more signal transmitted from that neighbor cell and based on one or more measurement criterion parameters, and based on the one or more evaluation offsets in which the one or more evaluation offsets are applied when that neighbor cell is preferred RAT connectivity capable and are not applied when that neighbor cell is not preferred RAT connectivity capable, and
wherein when the one or more cell selection values of a neighbor cell are determined based on the one or more evaluation offsets, a likelihood of the neighbor cell being selected as the new serving cell is increased relative to when the cell selection values are not determined based on the one or more evaluation offsets.

20. The network node of claim 19, wherein each neighbor cell that is preferred RAT connectivity capable is prioritized to be selected as the new serving cell over each neighbor cell that is not preferred RAT connectivity capable.

21. A network node of a network serving a user equipment (UE), the network node comprising:
a transceiver circuitry;
a memory circuitry; and
a processor circuitry,
wherein the transceiver circuitry, the memory circuitry, and the processor circuitry are configured to:
determine one or more reselection parameters defining biases to favor connectivity of the UE to a preferred radio access technology (RAT) connectivity capable cell over a non-preferred RAT connectivity capable cell when the UE performs a cell reselection from a current serving cell to a new serving cell, the one or more reselection parameters including one or more current serving cell reselection offsets and one or more new serving cell selection offsets; and
send to the UE the one or more reselection parameters in one or more reconfiguration messages,
wherein the one or more reselection parameters are determined offline and/or determined based on minimization of drive test (MTD) reports,
wherein a preferred RAT connectivity capable cell refers to a preferred RAT capable cell or to a cell capable of providing connectivity to a preferred RAT capable cell, wherein the one or more current serving cell reselection offsets comprise one or more measurement delay offsets and/or one or more measurement acceleration offsets,
one or more cell selection values of the current serving cell being initially determined based on one or more measurements at the UE of one or more signals transmitted from the current serving cell and based on one or more measurement criterion parameters,
the one or more initially determined cell selection values of the current serving cell being modified by the one or more measurement delay offsets when the current serving cell is preferred RAT connectivity capable;
the one or more initially determined cell selection values of the current serving cell being modified by the one or more measurement acceleration offsets when the current serving cell is not preferred RAT connectivity capable,
cell reselection being triggered when the one or more modified cell selection values are less than one or more measurement trigger thresholds, and
wherein when the one or more initial cell selection values of the current serving cell are modified by the measurement delay offset, the triggering of the cell reselection is delayed relative to when the one or more initial cell selection values of the current serving cell are modified by the measurement acceleration offset.

22. A network node of a network serving a user equipment (UE), the network node comprising:
a transceiver circuitry;
a memory circuitry; and
a processor circuitry,
wherein the transceiver circuitry, the memory circuitry, and the processor circuitry are configured to:
determine one or more reselection parameters defining biases to favor connectivity of the UE to a preferred radio access technology (RAT) connectivity capable cell over a non-preferred RAT connectivity capable cell when the UE performs a cell reselection from a current serving cell to a new serving cell, the one or more reselection parameters including one or more current serving cell reselection offsets and one or more new serving cell selection offsets; and
send to the UE the one or more reselection parameters in one or more reconfiguration messages,
wherein the one or more reselection parameters are determined offline and/or determined based on minimization of drive test (MTD) reports,
wherein a preferred RAT connectivity capable cell refers to a preferred RAT capable cell or to a cell capable of providing connectivity to a preferred RAT capable cell,
wherein the one or more reselection parameters are sent in one or more system information block (SIB) messages to the UE, the one or more reselection parameters including one or more evaluation offsets representing a basis of determining one or more selection values of the current serving cell when the current serving cell is preferred RAT connectivity capable, the one or more cell selection values being determined at the UE based on one or more measurements at the UE of one or more signals transmitted from the current serving cell, based on one or more measurement criterion parameters, and based on the one or more evaluation offsets in which the one or more evaluation offsets are applied when the current serving cell is preferred RAT connectivity capable and are not applied when the current serving cell is not preferred RAT connectivity capable, and
wherein when the one or more cell selection values are determined based on the one or more evaluation offsets, the triggering of the cell reselection is delayed relative to when the cell selection values are not determined based on the one or more evaluation offsets.

* * * * *